(12) United States Patent
Kawasaki et al.

(10) Patent No.: US 7,487,521 B2
(45) Date of Patent: Feb. 3, 2009

(54) CARTRIDGE FOR PHOTOSENSITIVE RECORDING MEDIUM

(75) Inventors: Hidetoshi Kawasaki, Kanagawa (JP); Tetsuya Takatori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 437 days.

(21) Appl. No.: 11/315,353

(22) Filed: Dec. 23, 2005

(65) Prior Publication Data
US 2006/0143642 A1 Jun. 29, 2006

(30) Foreign Application Priority Data
Dec. 24, 2004 (JP) .............................. 2004-373873

(51) Int. Cl.
*G11B 23/03* (2006.01)
(52) U.S. Cl. ...................................... 720/718
(58) Field of Classification Search ........................ None
See application file for complete search history.

(56) References Cited

U.S. PATENT DOCUMENTS 7,337,454 B2 * 2/2008 Tajima et al. ............... 720/738

2003/0198177 A1 * 10/2003 Horimai et al. ............. 369/291
2004/0233797 A1 11/2004 Obata et al.

FOREIGN PATENT DOCUMENTS

| JP | 59-215086 A | 12/1984 |
| JP | 2003-317422 A | 11/2003 |
| JP | 2004-29476 A | 1/2004 |

* cited by examiner

*Primary Examiner*—Mark Blouin
(74) *Attorney, Agent, or Firm*—Sughrue Mion, PLLC

(57) ABSTRACT

A cartridge is composed of a cartridge body and a shutter. A hologram recording disk is rotatably contained in a disk recess formed in the cartridge body. The shutter comprises upper and lower shutter plates between which the cartridge body is interposed. The shutter opens and closes openings formed in both surfaces of the cartridge body. When the shutter is kept in a closed position where the openings are closed, the edges of the shutter are inserted into slits formed around the opening. Further, a groove is formed at an end portion of the shutter. Into the groove, a ridge formed on the cartridge body is inserted.

22 Claims, 21 Drawing Sheets

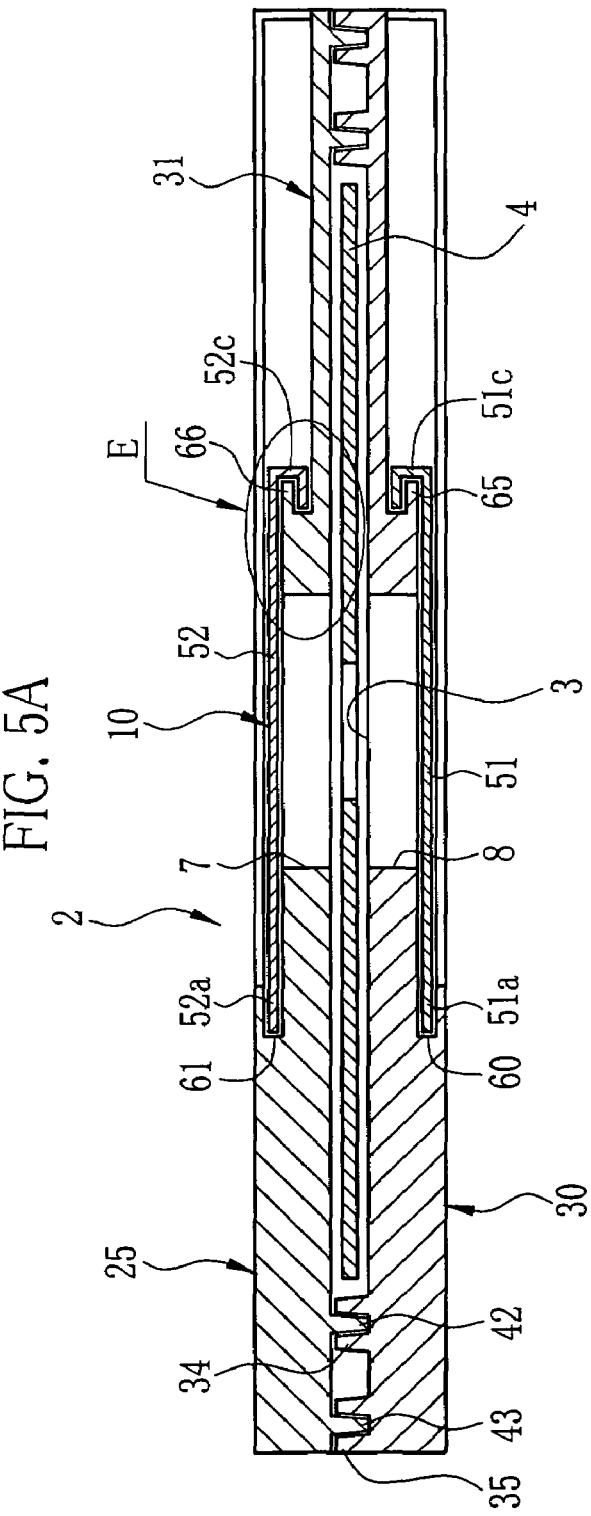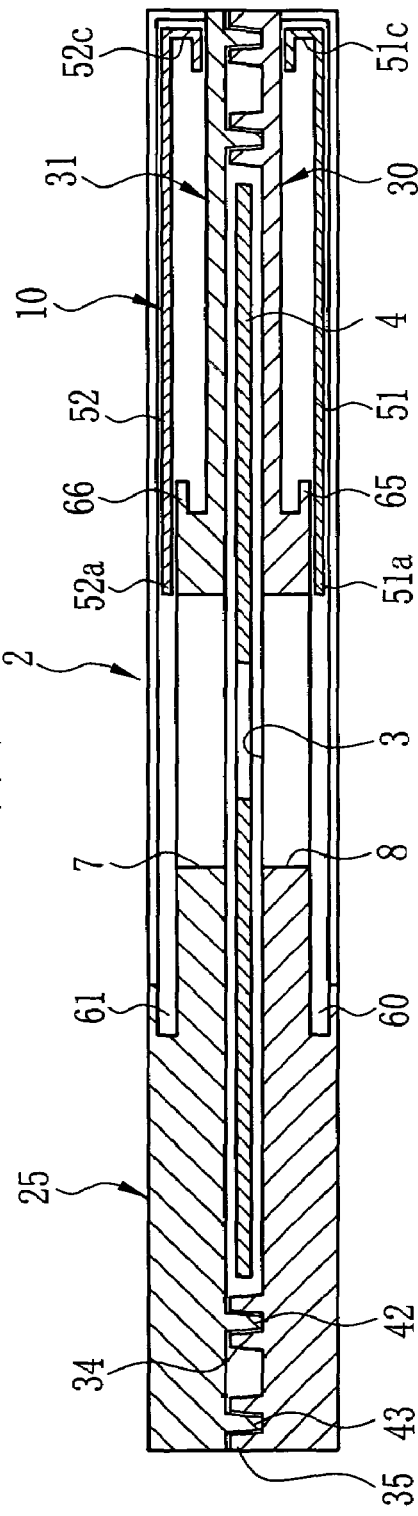

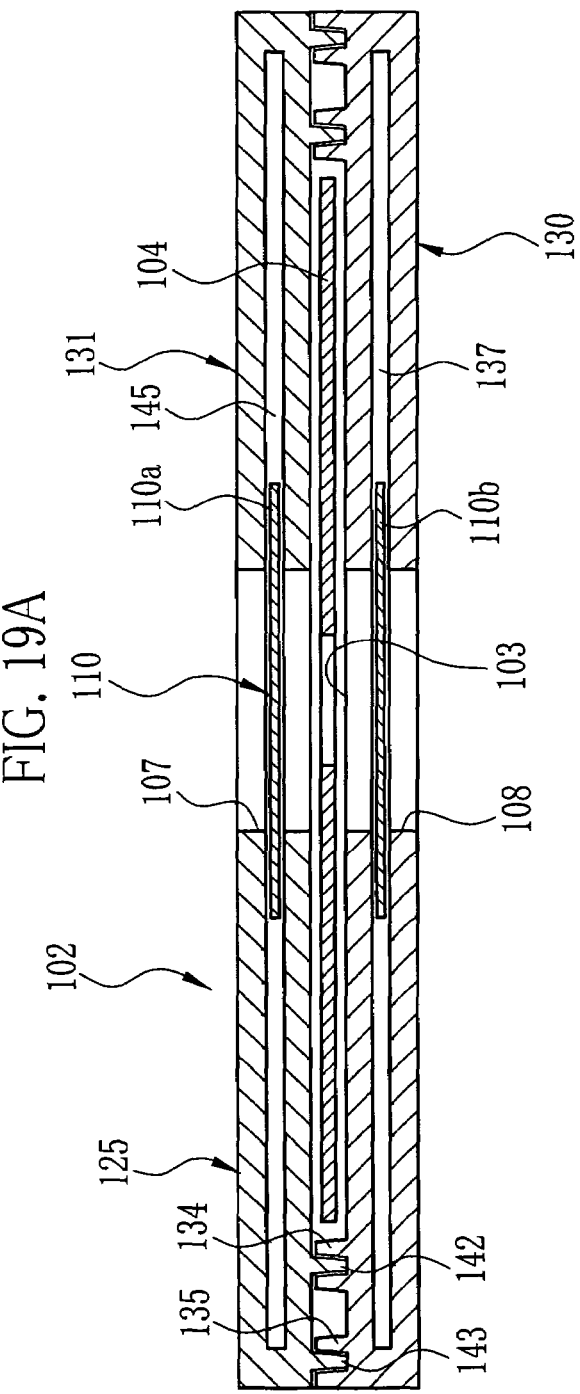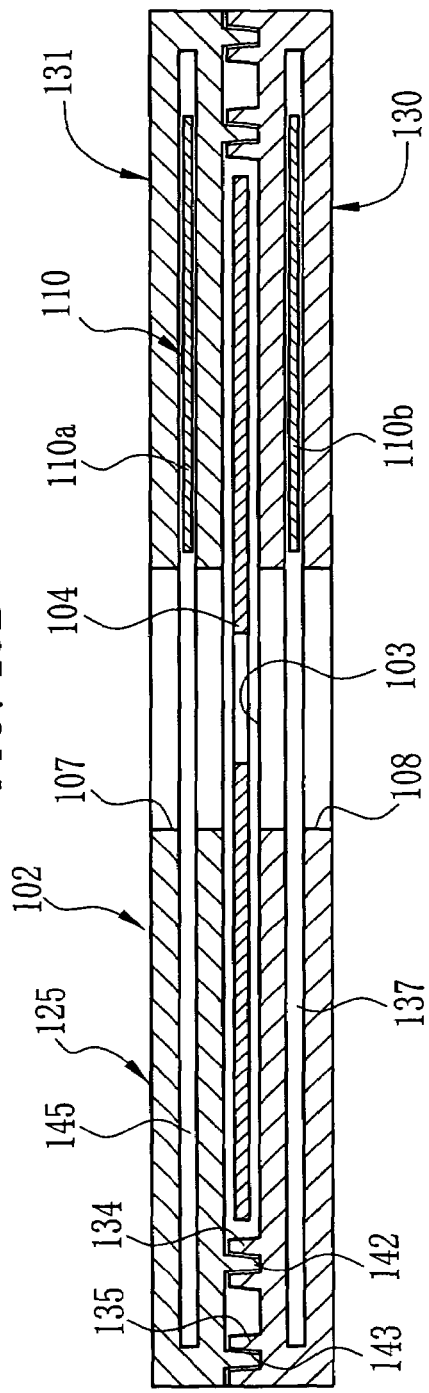

CARTRIDGE FOR PHOTOSENSITIVE RECORDING MEDIUM

BACKGROUND OF THE INVENTION

1. Field of the Invention

The present invention relates to a cartridge for containing a photosensitive recording medium, and in particular relates to improvement of light shielding performance and dustproof performance of interspace formed between a cartridge body and a shutter, which constitute a cartridge for containing a hologram recording medium being as the photosensitive recording medium.

2. Description of the Related Art

A hologram recording medium for recording data by means of a hologram is invented (see Japanese Patent-Laid Open Publication No. 2004-029476, for instance). The hologram recording medium is a photosensitive recording medium comprising a hologram recording layer, which is made of a photosensitive material and is formed on a disk-shaped support. By recording the data in multi layers as interference fringes of a laser beam, it is possible to obtain larger capacity of data storage in comparison with a DVD, which is a conventionally prevailing recording medium. As to this hologram recording medium, performance thereof is adversely affected when the hologram recording layer is exposed to the light and when dust adheres thereto. Thus, the hologram recording medium is contained in a cartridge having light shielding properties and dustproof properties when treated (see Japanese Patent Laid-Open Publication No. 2003-317422, for instance).

In the invention described in the above-noted Publication No. 2004-029476, the hologram recording medium is contained in a cartridge similar to a DVD-RAM cartridge. This cartridge is made of a material having small light transmittance relative to a wavelength region wherein the hologram recording layer is affected. Meanwhile, in the invention described in the above-noted Publication No. 2003-317422, the cartridge is made of a material by which the light having a sensitive color of the hologram recording layer is shielded. Further, a sponge-like light-shielding material is applied to a joint of movable portions, which is for exposing the hologram recording medium to the outside.

If the cartridge described in the Publication No. 2004-029476 has a general structure for containing a disk-shaped recording medium, it is considered that this cartridge comprises an upper shell, a lower shell, openings and a shutter. The upper and lower shells contain the recording medium so as to interpose this medium in a rotatable manner. The openings are formed in the upper and lower shells so as to expose a part of the recording medium to the outside. The shutter opens and closes the opening. By the way, in case of the cartridge containing the hologram recording medium, if interspace formed between a cartridge body and a shutter is not properly shaded and sealed, light and dust enter the cartridge to adversely affect the hologram recording medium. Although the cartridge described in the Publication No. 2004-029476 uses the material having the small light transmittance, there is no description regarding a light shielding structure and a dustproof structure of the interspace formed between the cartridge body and the shutter.

As to the cartridge described in the above-noted Publication No. 2003-317422, the interspace formed between the cartridge body and the shutter is shaded with a sponge-like light-shielding material. However, in case the light-shielding material peels or deteriorates, there arises a problem in that light and dust are prevented from being effectively shut out.

SUMMARY OF THE INVENTION

In view of the foregoing, it is a primary object of the present invention to provide a cartridge in which a photosensitive recording medium of a hologram recording medium and so forth is effectively protected from light and dust.

In order to achieve the above and other objects, the cartridge for the photosensitive recording medium according to the present invention comprises a cartridge body provide with a slit into which the edge of a shutter is inserted when the shutter is kept in a closed position. In virtue of this, a labyrinth-like light-shielding structure is formed between the edge of the shutter and the cartridge body. Thus, it is possible to contain the photosensitive recording medium without exposure and in clean conditions.

In another embodiment of the present invention, the shutter is provided with a groove formed at an end portion thereof. Into the groove, a ridge formed on the cartridge body is inserted when the shutter is kept in a closed position. Also in this case, a proper light-shielding structure is formed between the cartridge body and the shutter. Incidentally, the edge of the shutter may be inserted into the slit of the cartridge body in the state that the ridge of the cartridge body is inserted into the groove of the shutter.

It is preferable that mat processing and emboss processing are performed for cartridge-body surfaces, which confront the photosensitive recoding medium and the shutter, so as to make surface roughness 5μm to 20μm. In virtue of this, even if the light has passed through a gap of the cartridge body and the shutter, the light is diffused and attenuated by the rough surface so that influence is reduced for a photosensitive recording medium.

In a case that the cartridge body is composed of first and second shells fixed by welding, it is preferable that the first and second shells are made of plastic, especially the same or similar thermoplastic. Further, it is preferable that other parts of the shutter and so forth are made of material different from the first and second shells. By doing so, the first and second shells are prevented from being welded with the other parts at a time when the first and second shells are welded.

It is preferable that the plastic used for forming the cartridge body and the shutter includes light shielding substance by 0.01 to 5.00 wt. %. When carbon black is used as the light shielding substance, it is preferable to add the carbon black by 0.01 to 2.00 wt. %. In virtue of this, light transmission of the cartridge body and the shutter is lowered so that light-shielding performance of the cartridge is improved.

Moreover, it is preferable that the plastic used for forming the cartridge body and the shutter includes silicon-based lubricant by 0.1 to 5.0 wt. %. In virtue of this, a shutter operation becomes smooth so that shavings are prevented from being generated due to friction caused between the shutter and the cartridge body.

According to the cartridge of the present invention, light and dust are effectively prevented from entering through the joint portion of the cartridge body and the shutter so that the photosensitive recording medium is light-tightly contained in clean conditions. Since this effect is obtained by forming the light-shielding structure on the cartridge body and the shutter to improve the light-shielding performance and the dustproof performance, it is unnecessary to increase a number of parts for shielding the light and it is possible to produce the cartridge at comparatively low cost.

BRIEF DESCRIPTION OF THE DRAWINGS

The above objects and advantages of the present invention will become apparent from the following detailed description of the preferred embodiments of the invention when read in conjunction with the accompanying drawings, in which:

FIGS. 5A and 5B are section views of the cartridge in a direction perpendicular to the loading direction;

FIGS. 19A and 19B are section views of the cartridge in a direction perpendicular to the loading direction;

DETAILED DESCRIPTION OF THE PREFERRED EMBODIMENT(S)

Figure 1:
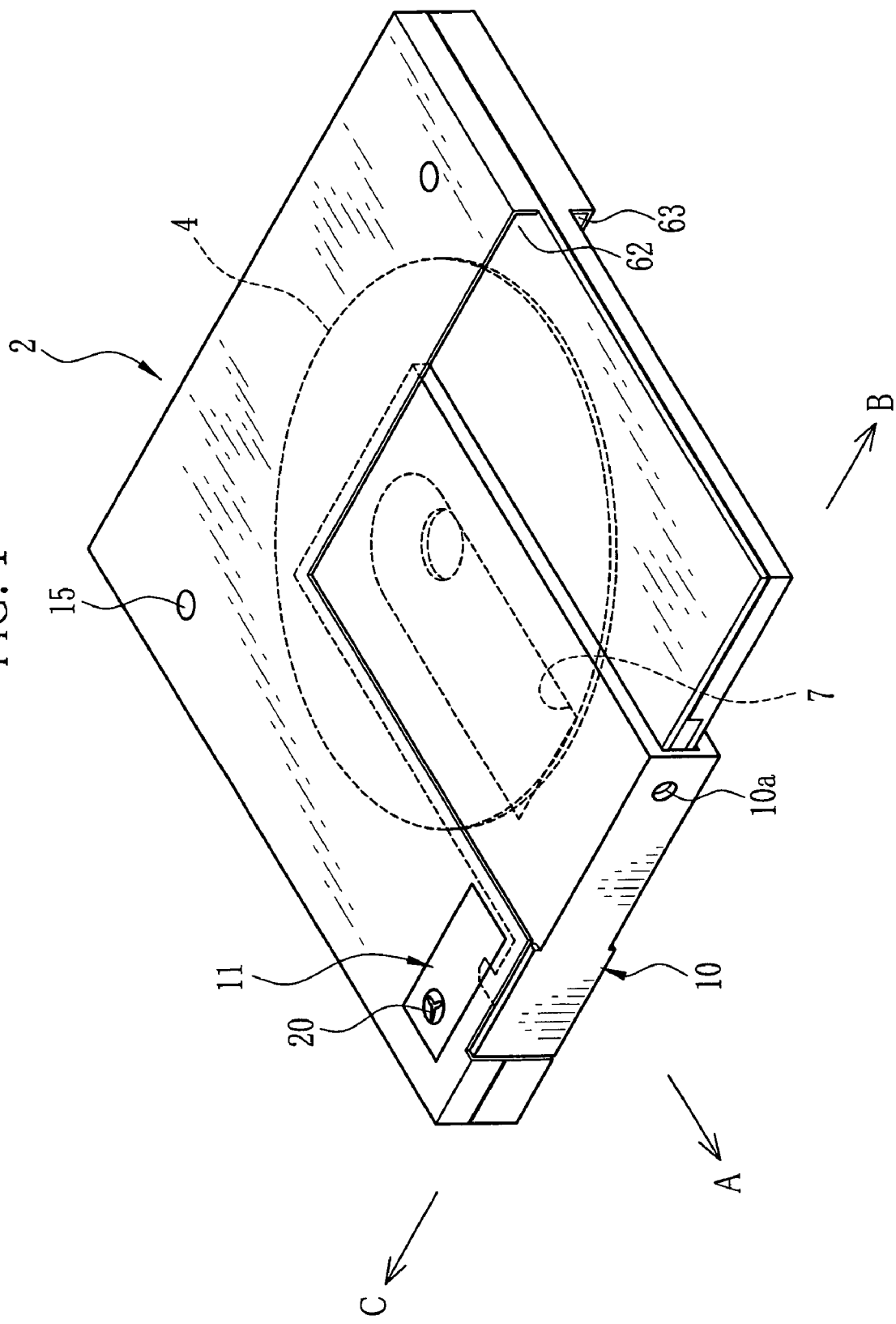
FIG. 1 is a perspective view showing a cartridge of a first embodiment.
Figure 2:
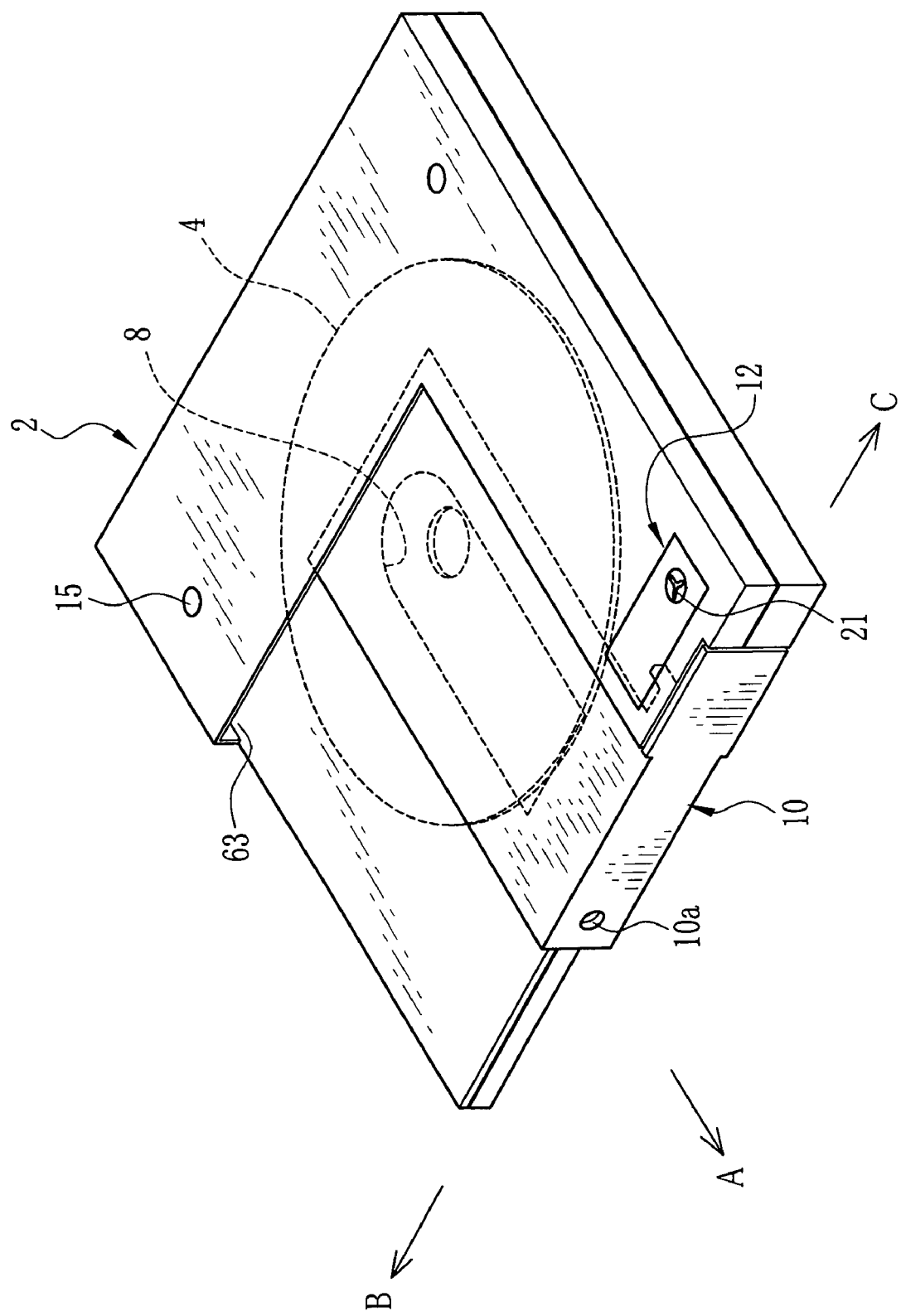
FIG. 2 is a perspective view showing a rear side of the cartridge.
Figure 3:
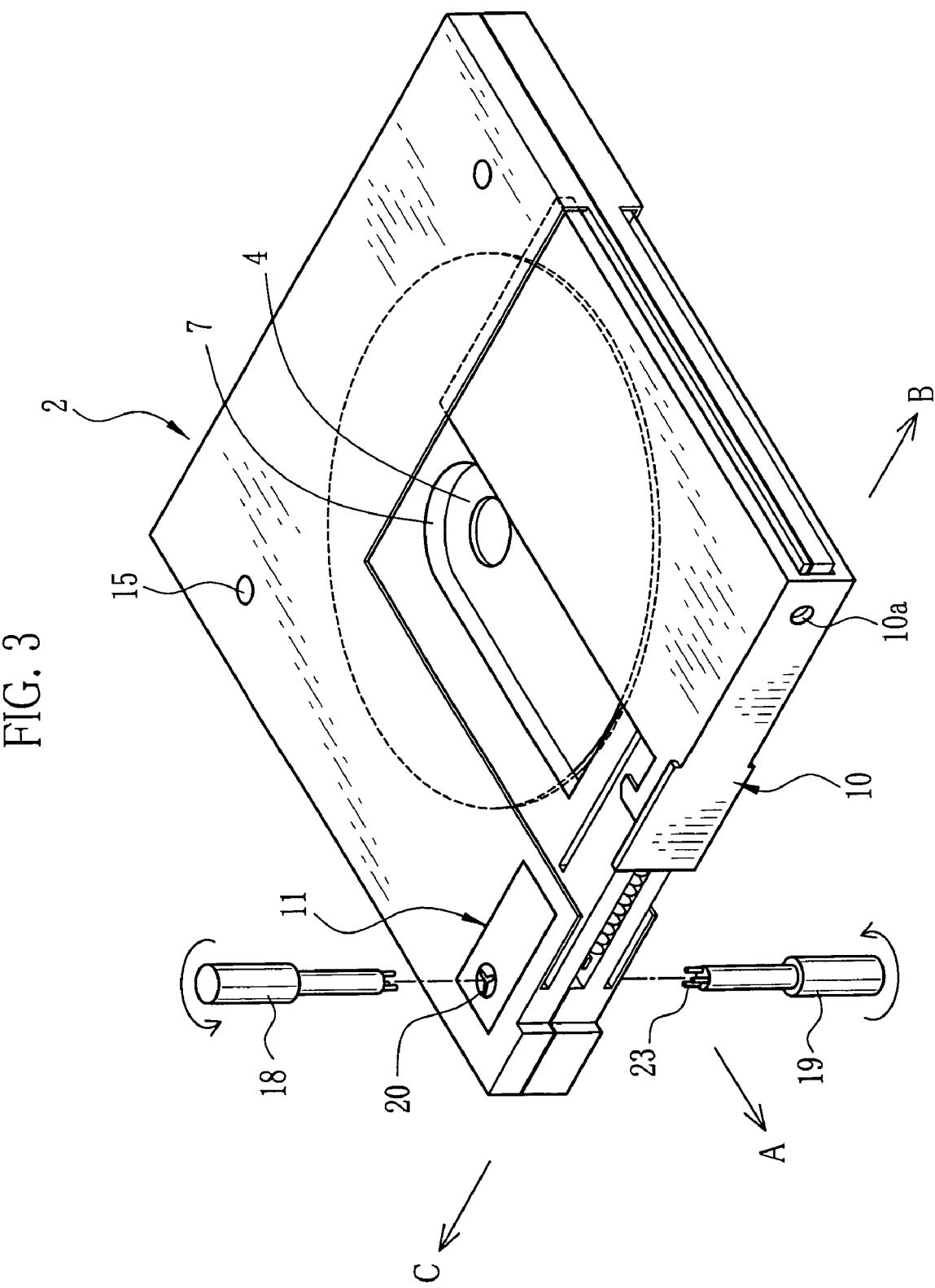
FIG. 3 is a perspective view showing a shutter open state of the cartridge.
Figure 4:
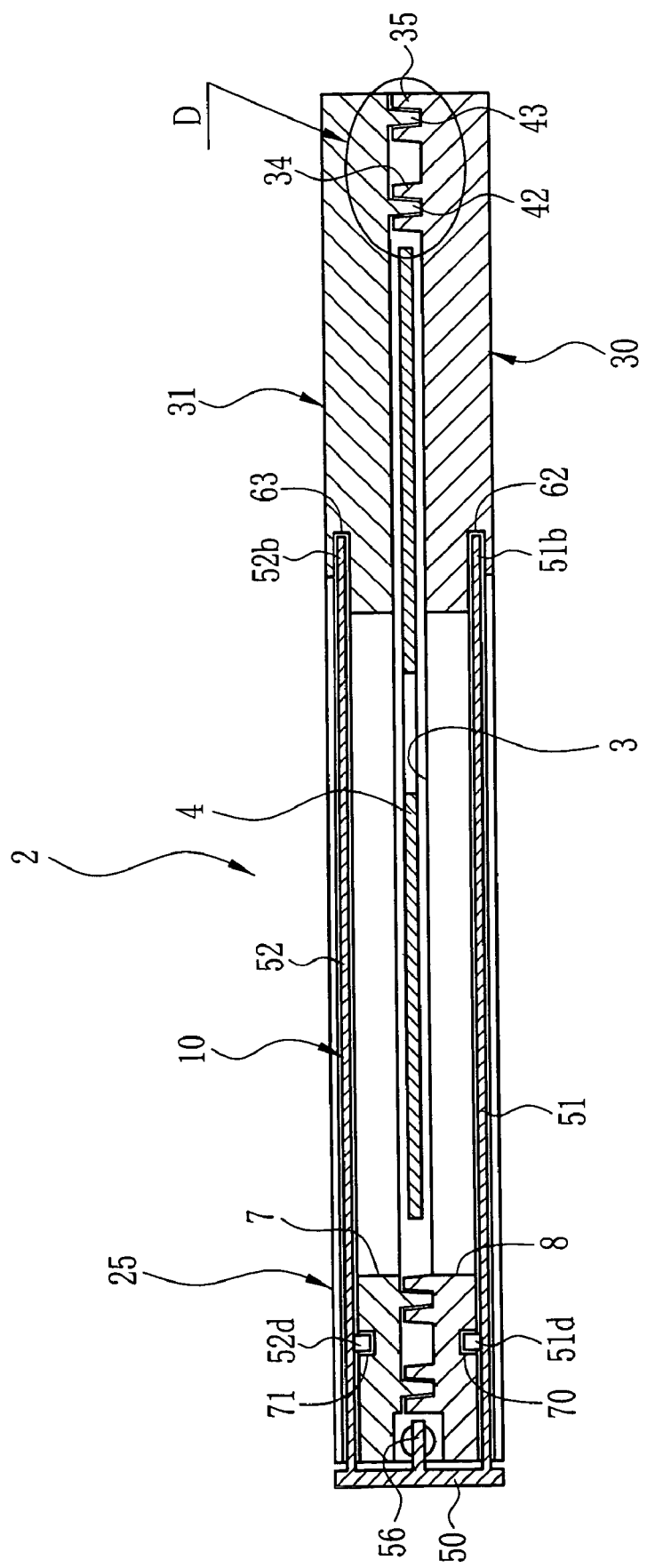
FIG. 4 is a section view of the cartridge in a loading direction thereof.

A first embodiment of a cartridge according to the present invention is described below. FIG. 1 to FIG. 3 are perspective views showing the cartridge of this embodiment. FIG. 4 is a partial section view of the cartridge taken in a loading direction thereof. FIGS. 5A and 5B are partial section views of the cartridge taken in a direction perpendicular to the loading direction.

The cartridge 2 rotatably contains a disk-shaped hologram recording medium (hereinafter referred to as recording disk) 4 in a disk recess 3, which is formed in the cartridge 2. The recording disk 4 is contained in the cartridge 2 and is handled in this state.

The recording disk 4 is a photosensitive recording medium having a hole formed at its central portion. Both surfaces of the recording disk 4 are provided with hologram recording layers made of a photosensitive material. In the hologram recording layer, data is recorded by a laser beam whose wavelength is within a region of green 532 nm to blue 405 nm, for example. The data is recorded in a multilayer manner as interference fringes of the laser beam. Incidentally, a reinforcing member may be attached to the hole of the recording disk 4.

Openings 7 and 8 are formed in upper and lower surfaces of the cartridge 2 to expose the recording disk 4, which is contained in the disk recess 3, to the outside. The openings 7 and 8 are usually closed by a shutter 10 disposed at the outside of the cartridge 2 in a movable manner. Upon moving the shutter 10 toward an open position in a direction shown by an arrow B, the openings 7 and 8 are opened. The shutter 10 is urged by a spring toward a closed position in a direction shown by an arrow C. The shutter 10 is locked in the closed position by lock mechanisms 11 and 12, which are respectively disposed at both sides of the cartridge 2 so as to be independently operated. In virtue of the lock mechanisms, it is prevented that the shutter 10 is moved due to vibration, impact and so forth applied to the cartridge 2 to improperly open the openings 7 and 8.

The cartridge 2 is inserted into a recording device and a cartridge slot in a loading direction A. The recording device records the date in the recording disk 4. The cartridge slot is formed in a reproducing device for reading the data from the recording disk 4. The cartridge 2 loaded in the recording device and the reproducing device is positioned by positioning holes 15 formed in both surfaces of the cartridge, and the shutter 10 is moved to the open position to open the openings 7 and 8. For example, when the cartridge 2 is loaded in the device in a state of FIG. 1, a pick-up unit of the device is inserted through the lower opening 8 into the cartridge 2 to record the data in the lower hologram recording layer of the recording disk 4 or to reproduce the data recorded in the lower hologram recording layer thereof. Meanwhile, when the cartridge 2 is loaded in the device in a reverse state such as shown in FIG. 2, the pick-up unit is inserted through the opening 7, which is currently positioned at the lower side, to record the data in the hologram recording layer of the upper surface of the recording disk 4 shown in FIG. 1 or to reproduce the data recorded in the upper surface thereof.

The recording device and the reproducing device include a lock-releasing mechanism for releasing the lock mechanisms 11 and 12 of the cartridge 2. These devices further include a shutter-opening mechanism for moving the shutter 10 between the closed position and the open position. As shown in FIG. 3, the lock-releasing mechanism moves releasing jigs 18 and 19 in an axial direction to engage the jigs 18 and 19 with engagement parts 20 and 21, which are respectively disposed at both surfaces of the cartridge 2 to release the lock mechanisms 11 and 12. The engagement parts 20 and 21 have a trifurcate shape, for example, and the releasing jigs 18 and 19 have three engagement pins 23 so as to be capable of easily engaging with the engagement parts 20 and 21.

The releasing jigs 18 and 19 engage with the engagement parts 20 and 21. After that, the jigs 18 and 19 are respectively rotated in a counterclockwise direction to release the lock mechanisms 11 and 12. Successively, the shutter opening mechanism inserts a drive pin into a hole 10a, which is formed in a lateral side of the shutter 10, to move the shutter 10 in the opening direction B. And then, the shutter 10 is slid to open the openings 7 and 8 of both surfaces of the cartridge 2 such as shown in FIG. 5B.

Figure 6:
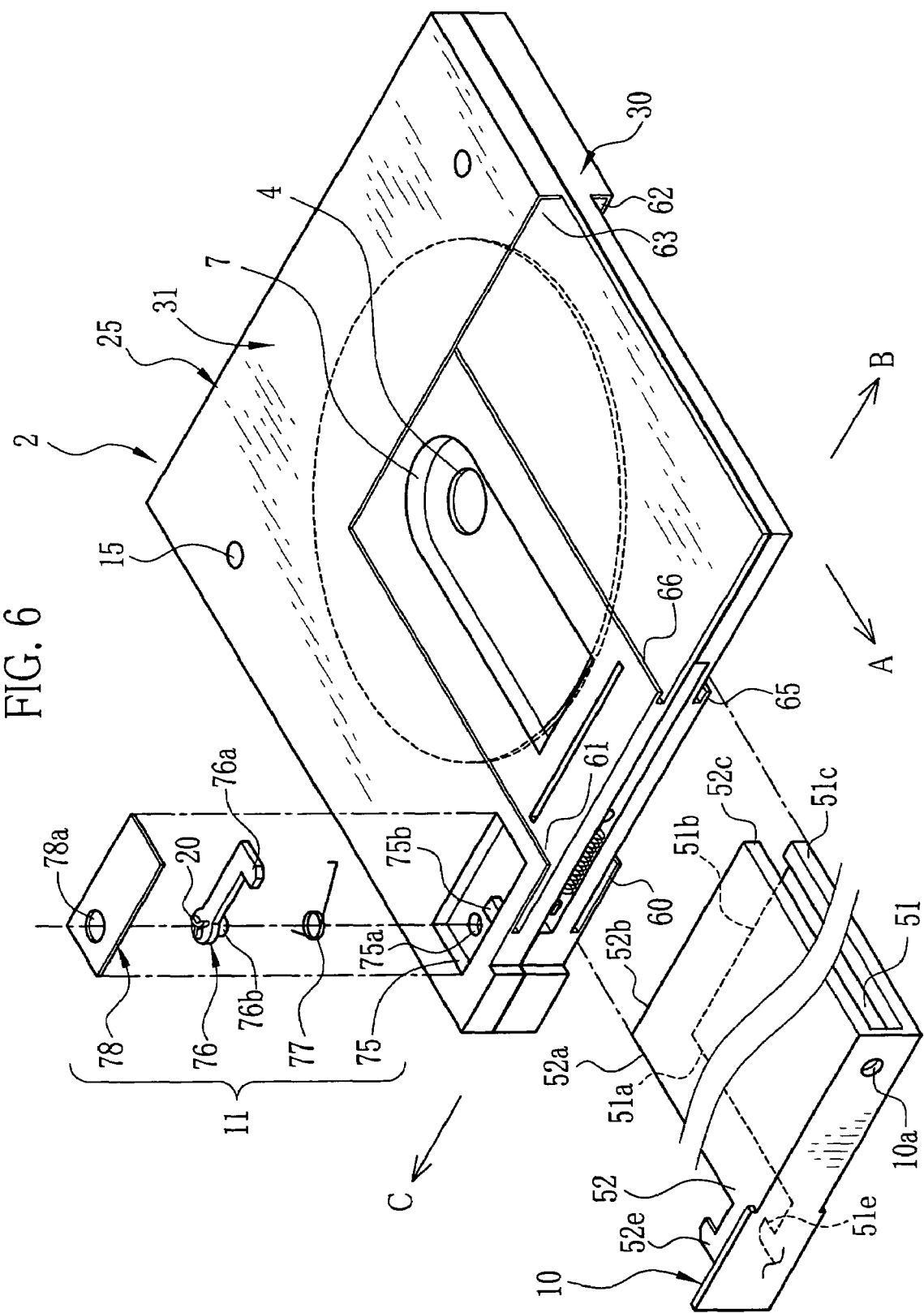
FIG. 6 is an exploded perspective view showing a structure of the cartridge.

FIG. 6 is an exploded perspective view showing a structure of the cartridge 2 comprising a cartridge body 25, the shutter 10 and the lock mechanisms 11 and 12. The cartridge body 25 rotatably contains the recording disk 4. The shutter 10 opens and closes the openings 7 and 8, which are formed in both surfaces of the cartridge body 25, from the outside. The lock mechanisms 11 and 12 are incorporated in the cartridge body 25. Incidentally, since the lock mechanism 12 is plane-symmetrical relative to the lock mechanism 11 and has the same structure therewith, illustration and detail description of the lock mechanism 12 are abbreviated.

Figure 7:
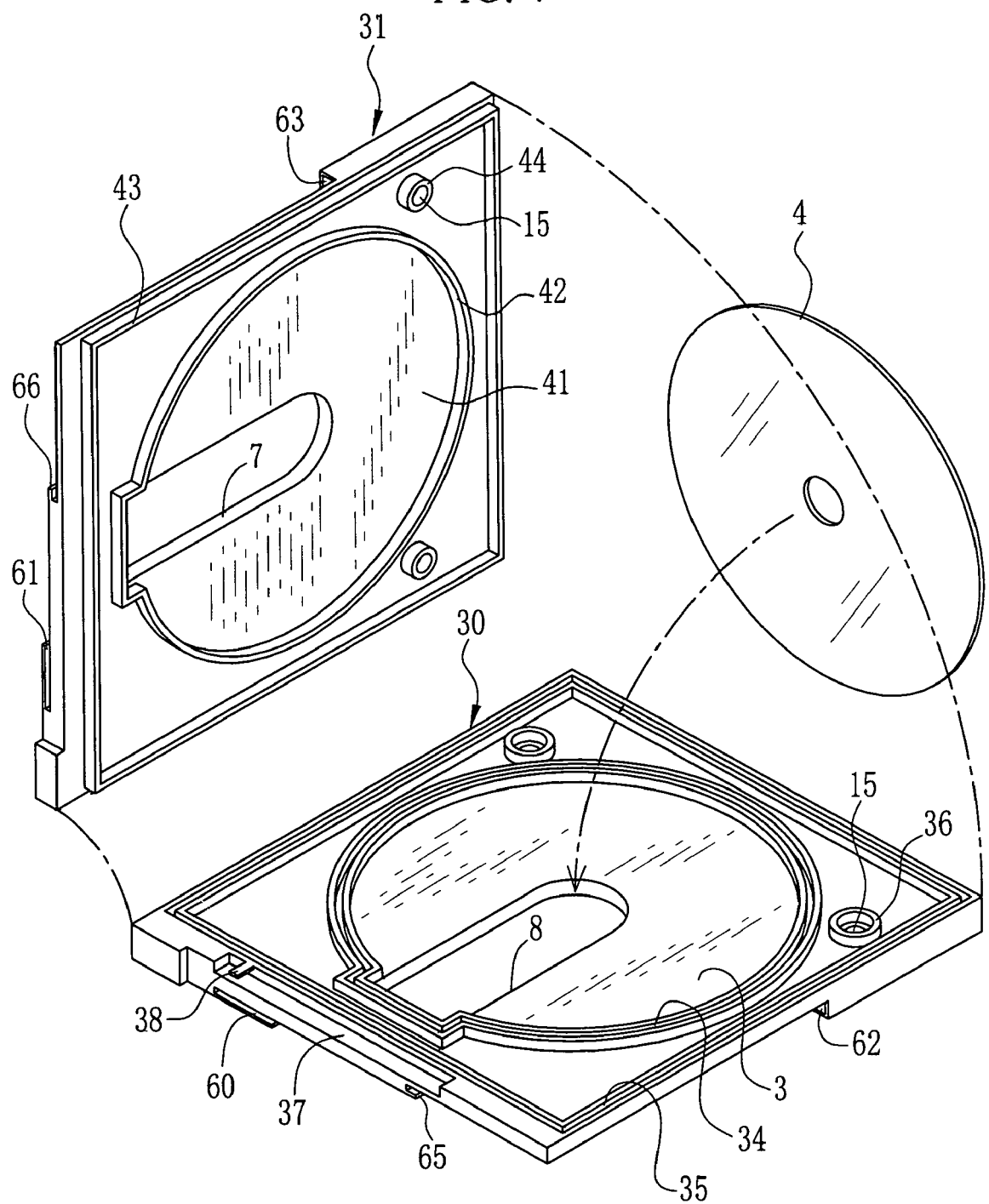
FIG. 7 is an exploded perspective view showing a structure of a cartridge body.

As shown in FIG. 7, the cartridge body 25 is composed of a lower shell 30 having a plate-like shape, and an upper shell 31 joined to an upper side of the lower shell 30. The lower and upper shells are made of identical or similar thermoplastic including light-shielding substance and lubricant. In this embodiment, the lower shell 30 is referred to as a first shell and the upper shell 31 is referred to as a second shell. However, the first and second shells may be reversed.

Various substances may be added as the light-shielding substance. However, it is preferable to add 0.01% to 5.00% by weight in accordance with the light-shielding substance to be used. For instance, carbon black is employed as the light-shielding substance. By adding the carbon black, it is possible to secure the light-shielding properties and to improve physical strength. A preferable amount of the carbon black to be added is 0.01 to 2.00 wt. %. When the amount of the added carbon black exceeds 0.01 wt. %, the light-shielding properties and the physical strength are improved. However, in case the amount of the added carbon black exceeds 2.00 wt. %, the physical strength deteriorates.

As the lubricant, silicone-based lubricants may be used, for example. By adding the silicone-based lubricant, frictional resistance is lowered. Thus, it is possible to reduce shavings to be caused by movement of the shutter 10. Moreover, it is also possible to reduce shavings to be caused at a time when the recording disk 4 comes into contact with an inner wall of the cartridge 2 due to a shock during transport. Further, handling for inserting the cartridge into the device is improved. Furthermore, flowability is improved so that kneading properties of a molding time, injection-molding processability and so forth are also improved.

A preferable amount of the silicone-based lubricant to be added is 0.1 to 3.0 wt. %. In case of 0.1 wt. % or less, there is no advantage. In case of 3.0 wt. % or more, the flowability becomes too excellent and slipping is caused between a screw and the resin at a time of kneading and molding. Due to this, the processability deteriorates. Further in this case, sometimes the lubricant bleeds out to a product surface and is transferred to the recording disk 4 and a hand of a user. As a result, troubles are caused regarding the handling properties and exterior appearance. By the way, when copolymer silicone is used, the lubricant may be added up to 5.0 wt. %, since the above-mentioned troubles are hardly caused.

An inner surface of the lower shell 30 is provided with the circular disk recess 3, a first concave portion 34, a second concave portion 35, a light-shielding fence 36 and a cutout 37. The disk recess 3 contains the recording disk 4. The first concave portion 34 protrudes so as to surround the disk recess 3. The second concave portion 35 is disposed along entire edges. The light-shielding fence 36 surrounds the periphery of the positioning hole 15. The cutout 37 is a space for containing a spring 54 of the shutter 10. The inside of the cutout 37 is integrally formed with a spring catch 38 on which one end of the spring 54 of the shutter 10 is put.

Meanwhile, an inner surface of the upper shell 31 is provided with an upper surface 41 constituting an upper portion of the disk recess 3 of the lower shell 30. The inner surface of the upper shell 31 is further provided with a first convex portion 42, a second convex portion 43 and a light-shielding fence 44. The first convex portion 42 is inserted into the first concave portion 34 of the lower shell 30. The second convex portion 43 is inserted into the second concave portion 35. The light-shielding fence 44 is inserted into the light-shielding fence 36 so as to surround the periphery of the positioning hole 15.

Figure 8:
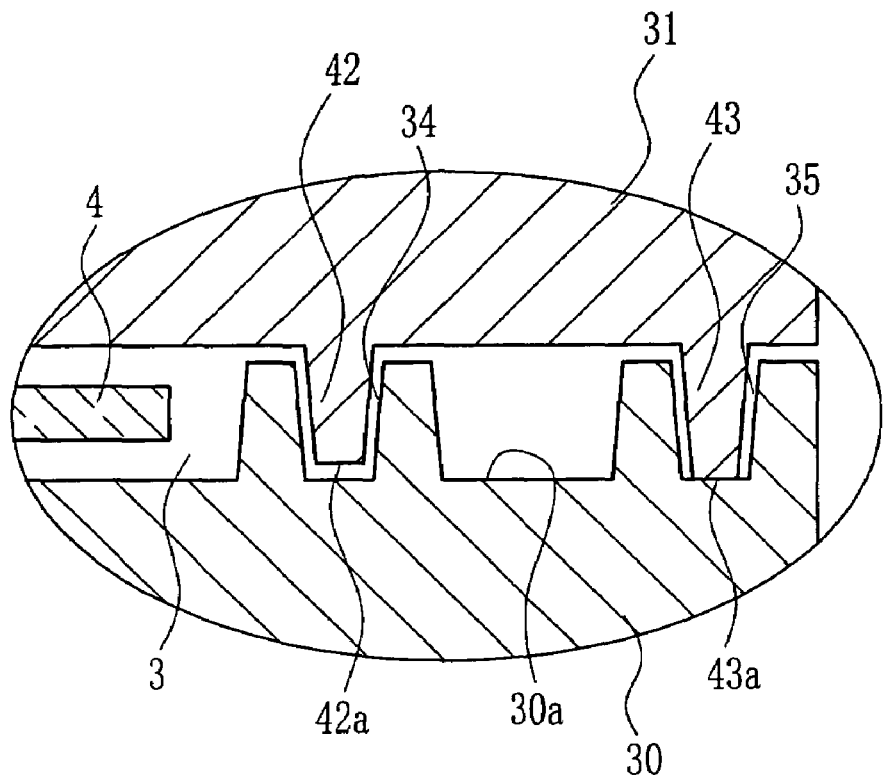
FIG. 8 is a section view showing a light-shielding structure comprising a convex and a concave.

The recording disk 4 is placed on the disk recess 3, and the upper shell 31 is superposed on the lower shell 30. Upon this, the first convex portion 42 is fitted into the first concave portion 34. FIG. 8 is an enlarged view of an area represented by an arrow D shown in FIG. 4. Such as shown in FIG. 8, the top 42a of the first convex portion 42 fitted into the first concave portion 34 confronts an inner surface 30a of the lower shell 30 to form a labyrinth-like light-shielding structure. Moreover, the second convex portion 43 is fitted into the second concave portion 35 and the top 43a thereof abuts on the inner surface 30a of the lower shell 30 to form a tight structure.

Figure 9:
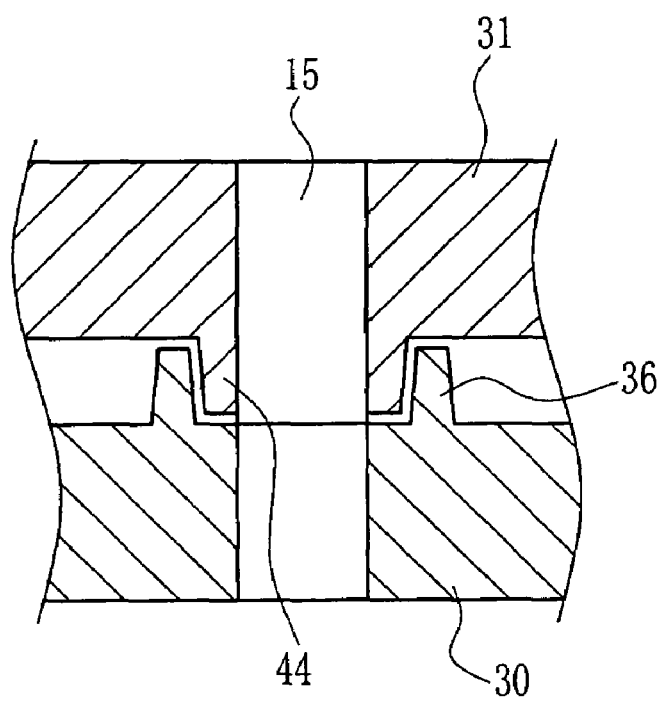
FIG. 9 is a section view showing a light-shielding structure of a positioning hole.

The periphery of the disk recess 3 is surrounded by the labyrinth-like light-shielding structure so that light and dust are prevented from entering the disk recess 3 through a joint portion of the lower shell 30 and the upper shell 31. Further, such as shown in a section view of FIG. 9, the two light-shielding fences 36 and 44 are fitted to form another labyrinth-like light-shielding structure at the periphery of the positioning hole 15 so that light and dust are prevented from entering the positioning hole 15. Incidentally, the positioning hole 15 is disposed at the outside of the light-shielding structure comprising the first concave portion 34 and the first convex portion 42. Thus, the positioning hole 15 does not affect the light-shielding properties and the dustproof properties of the disk recess 3.

The second convex portion 43 of the upper shell 31 is fixed to the inner surface 30a of the lower shell 30 by means of ultrasonic welding. In virtue of this, the lower shell 30 and the upper shell 31 are securely coupled so that an interspace is prevented from residing at the joint portion of them. When performing ultrasonic welding, sometimes plastic, powders scatter to a peripheral area. However, by performing ultrasonic welding in the second concave portion 35, the scatter is minimized so that the recording disk 4 is prevented from being dusty.

In a case that ultrasonic welding is performed for the lower and upper shells 30 and 31 after incorporating the shutter 10, the lock mechanism 11 and so forth in the cartridge body 25, sometimes the other parts of the shutter 10 and so forth are welded at the same time. In order to prevent this, a different kind of plastic from the lower and upper shells 30 and 31 may be used as the material of the other parts of the shutter 10 and so forth.

Figure 10:
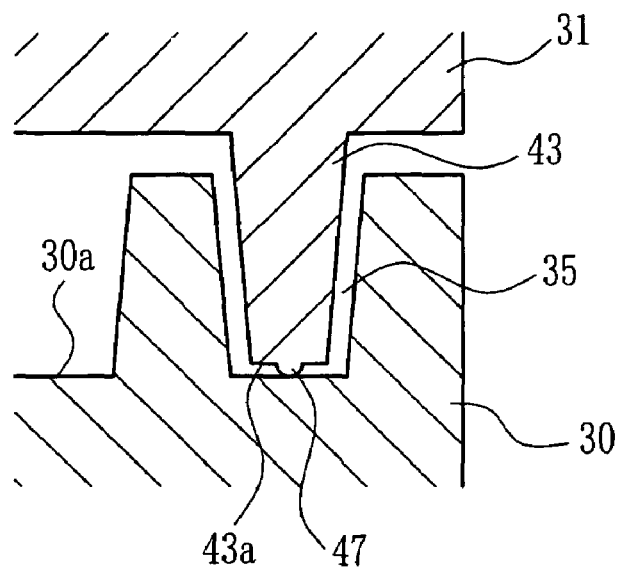
FIG. 10 is a section view showing the light-shielding structure provided with an energy director.

For the purpose of securely joining the lower and upper shells 30 and 31 by means of ultrasonic welding, the top 43a of the second convex portion 43 may be provided with a protruding energy director 47 such as shown in FIG. 10. When ultrasonic welding is performed in a state that the energy director is provided, ultrasonic energy concentrates to the energy director 47. In virtue of this, the second convex portion 43 is fixedly welded to the lower shell 30. Incidentally, ultrasonic welding of the lower and upper shells 30 and 31 may be performed for the entire second convex portion 43. Alternatively, ultrasonic welding may be performed in a spot form at regular intervals.

Figure 11:
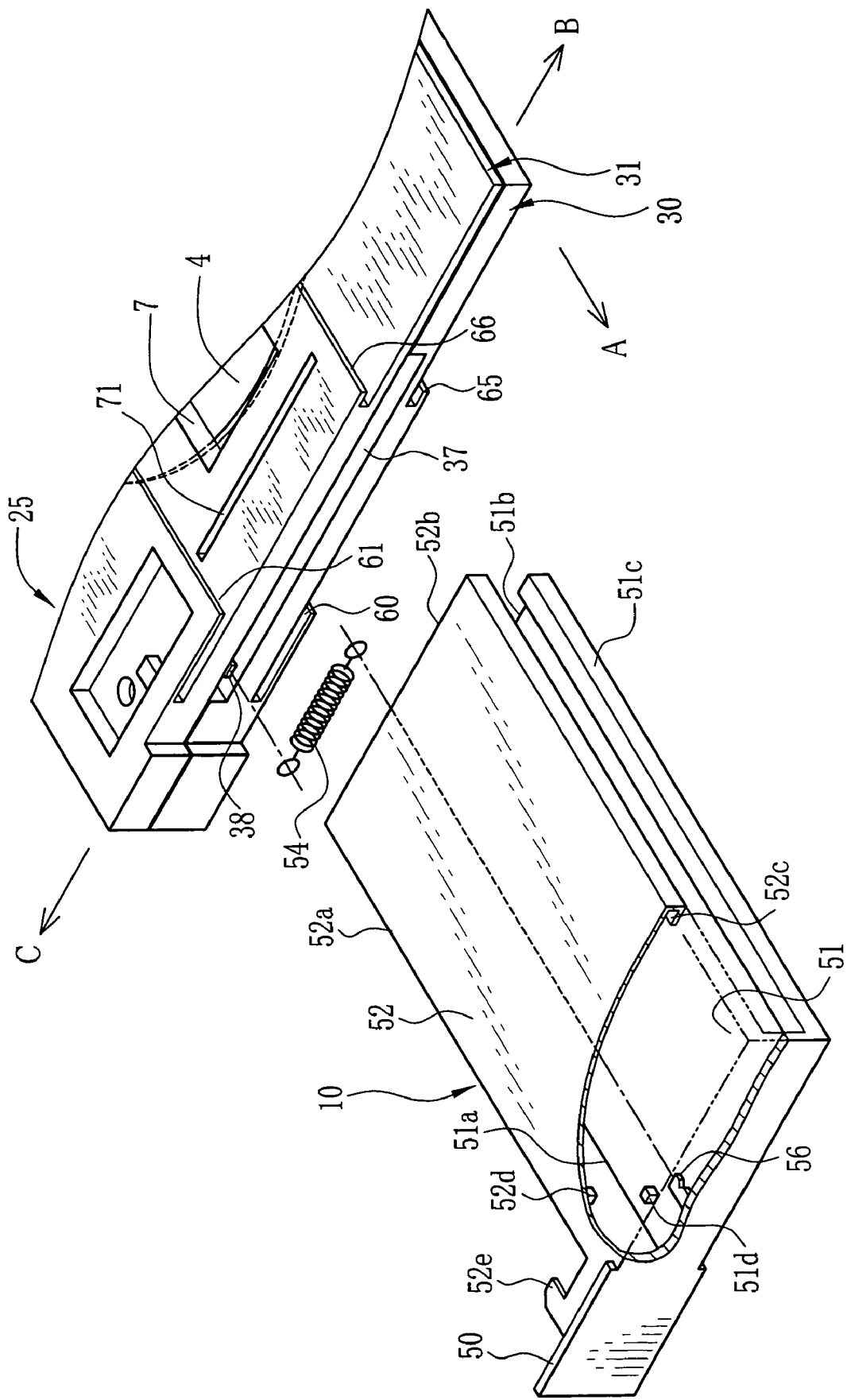
FIG. 11 is an exploded perspective view showing a structure of a shutter.

The shutter 10 is made of a different kind of plastic from the lower and upper shells 30 and 31. The plastic forming the shutter 10 may include light-shielding substance and lubricant similarly to the plastic used for forming the lower and upper shells 30 and 31. As shown in FIG. 11, the shutter 10 comprises a base 50 disposed at an edge of the cartridge body 25 in the loading direction A. The shutter 10 further comprises a lower shutter plate 51 and an upper shutter plate 52, which are integrally formed with the base 50 so as to interpose the upper and lower surfaces of the cartridge body 25. An inner surface of the base 50 is integrally formed with a spring catch 56 on which one end of the shutter spring 54 is put. The other end of the shutter spring 54 is contained in the cutout 37 and is put on the spring catch 38 of the lower shell 30 to urge the shutter 10 to the closed position.

Slits 60, 61, 62 and 63 are formed at outer surfaces of the lower and upper shells 30 and 31. The slits 60 and 61 respectively contain side edges 51a and 52a of the shutter plates 51 and 52 in the closing direction C. The slits 62 and 63 (see FIGS. 1 and 2) respectively contain rear edges 51b and 52b of the shutter plates 51 and 52 in the loading direction A. Meanwhile, grooves 51c and 52c having a U-like shape are respectively formed at side edges of the shutter plates 51 and 52 in the opening direction B. Ridges 65 and 66 are formed at the outer surfaces of the lower and upper shells 30 and 31. The ridges 65 and 66 are inserted into the grooves 51c and 52C when the shutter 10 is kept in the closed position.

When the shutter 10 is kept in the closed position, the edges 51a, 51b, 52a and 52b of the shutter plates 51 and 52 are respectively inserted into the slits 60, 62, 61 and 63 of the shells 30 and 31. At this time, the ridges 65 and 66 formed on the shell 30 and 31 enter the grooves 51c and 52c of the shutter plates 51 and 52. Thus, a space residing between the cartridge body 25 and the shutter 10 is also surrounded by the labyrinth-like light-shielding structure so that light and dust are effectively prevented from passing through a gap of the cartridge body 25 and the shutter 10.

Guide projections 51d and 52d are formed on the inner surfaces of the shutter plates 51 and 52 of the shutter 10. Guide grooves 70 and 71 (see FIG. 4) into which the guide projections 51d and 52d are inserted are formed on the outer surfaces of the shells 30 and 31. When the shutter 10 moves on the outer surface of the cartridge body 25, the guide projections 51d and 52d move inside the guide grooves 70 and 71. In virtue of this, the shutter 10 is capable of smoothly moving without slipping out of the cartridge body 25. Incidentally, since the raw material of the lower shell 30, the upper shell 31 and the shutter 10 is the plastic including the lubricant, it is prevented that shavings are caused due to friction at the time of movement of the shutter 10.

Figure 12:
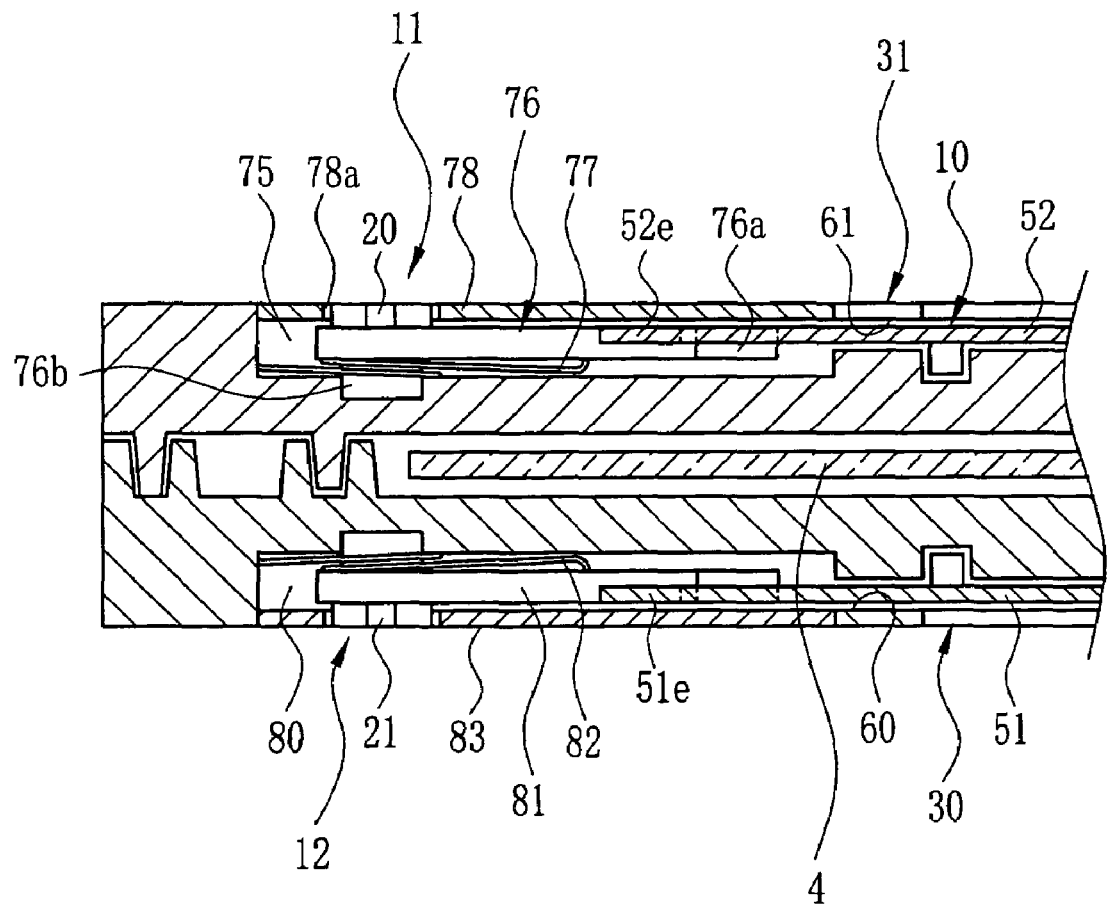
FIG. 12 is a partial section view showing a structure of a lock mechanism.

As shown in FIGS. 6 and 12, the lock mechanism 11 incorporated in the upper shell 31 comprises a concave 75, a lock lever 76, a lock spring 77 and a plate-like lock cover 78. The concave 75 is formed at the outer surface of the upper shell 31 and is connected to the slit 61. The lock lever 76 and the lock spring 77 are contained in the concave 75. The lock cover 78 closes the concave 75. The lock mechanism 11 locks the shutter 10 in the closed position by engaging the lock lever 76 with a claw 52e. The claw 52e to be engaged is integrally formed on the upper shutter plate 52 of the shutter 10.

The lock lever 76 is integrally formed with an engagement claw 76a for engaging with the claw 52e, a pivot 76b rotatably inserted into a hole 75a formed in the concave 75, and the trifurcate engagement part 20. The lock spring 77 comprises a torsion spring and is fitted to the pivot 76b. One end of the lock spring 77 is put on the lock lever 76 and the other end thereof abuts on an inner wall of the concave 75 so that the lock lever 76 is urged in a clockwise direction in the drawing. The engagement part 20 is exposed through a hole 78a, which is formed in the lock cover 78, so as not to protrude to the outside. Reference numeral 75b denotes a retainment member disposed in the concave 75. The retainment member 75b receives the lock lever 76, which is urged by the lock spring 77, to retain it in the engagement position where the claw 76a engages with the claw 52e.

The lock mechanism 11 incorporated in the lower shell 30 comprises a concave 80, a lock lever 81, a lock spring 82 and a plate-like lock cover 83. The concave 80 is formed at the outside surface of the lower shell 30 and is connected to the slit 60. The lock lever 81 and the lock spring 82 are disposed in the concave 80. The lock cover 83 covers the concave 80. The lock mechanism 12 locks the shutter 10 in the closed position by engaging the lock lever 81 with a claw 51e, which is integrally formed on the lower shutter plate 51 of the shutter 10. By the way, since the respective parts of the lock lever 12 are identical with those of the lock lever 11, detailed description thereof is abbreviated.

Figure 13A:
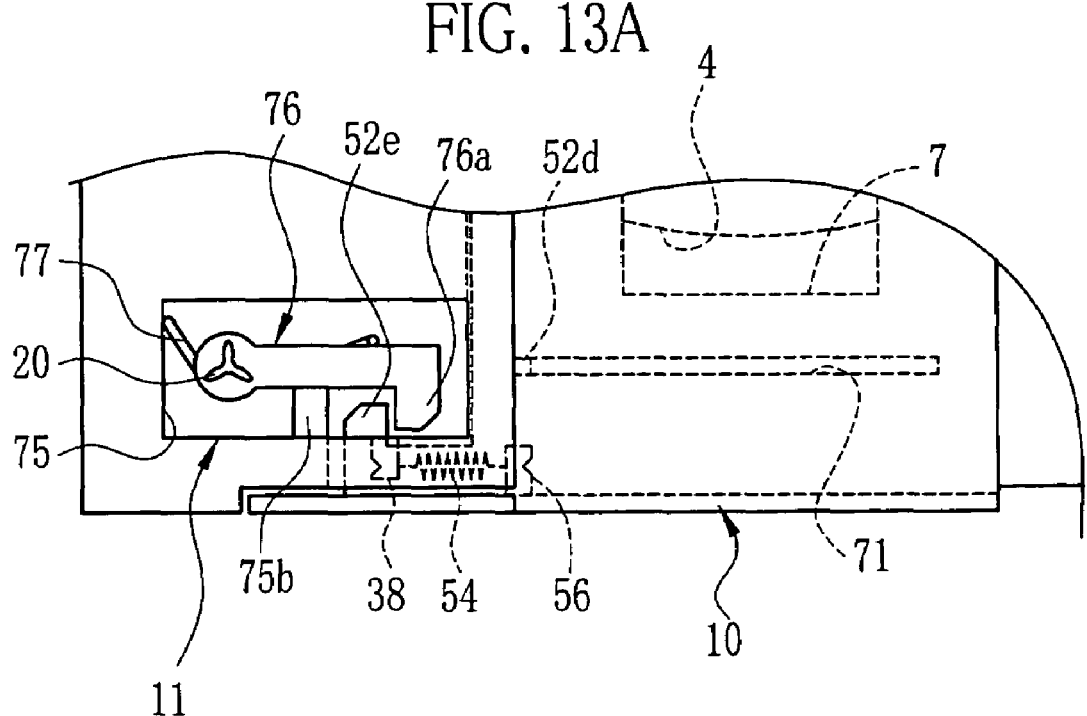
FIGS. 13A and 13B are illustrations for explaining an operation of the lock mechanism.

FIG. 13A is a plan view showing a lock state of the lock mechanism 11. Incidentally, for the purpose of showing an operation of the lock lever 76, FIG. 13A illustrates a state in that the lock cover 78 is removed. When the shutter 10 is kept in the closed position such as shown in FIGS. 1 and 5A, the engagement claw 76a engages with the counter-engagement claw 52e by the urging force of the lock spring 77. In virtue of this, movement of the shutter 10 is regulated in the opening direction. Thus, it is prevented that the shutter 10 is carelessly opened and the recording disk 4 is exposed.

Figure 13B:
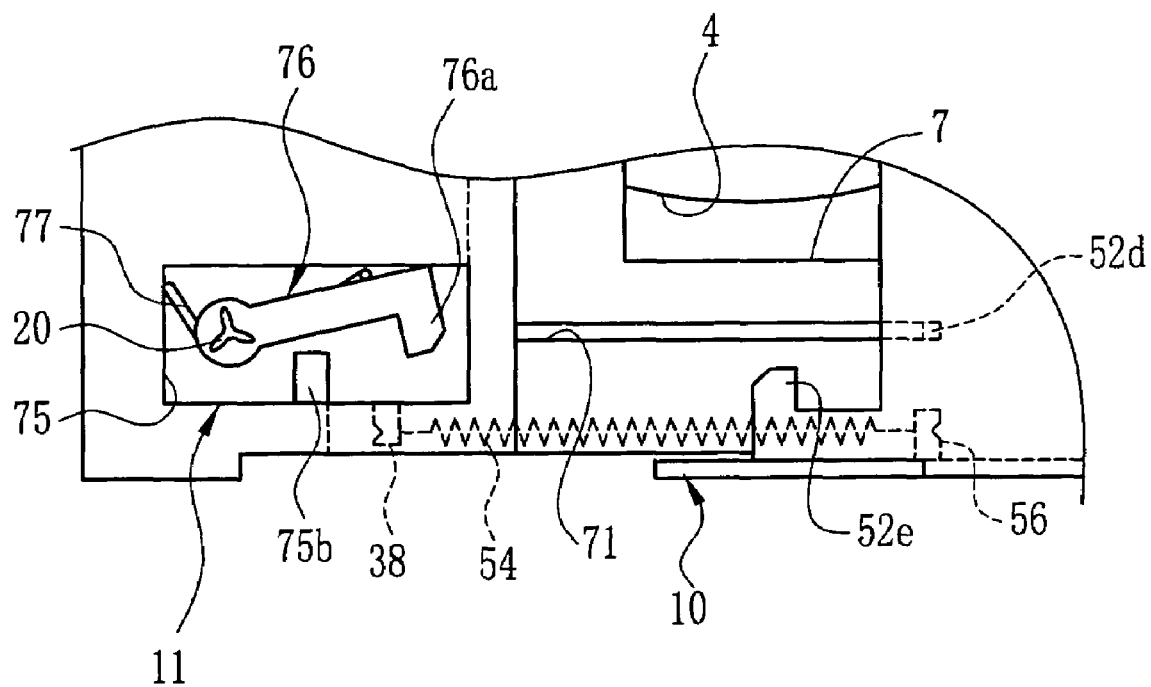

FIG. 13B shows a lock release state of the lock mechanism 11. Upon rotating the engagement part 20 by the releasing jig 18 in a release direction, or in the counterclockwise direction such as shown in FIG. 3, the lock lever 76 is also rotated in the counterclockwise direction against the urging force of the lock spring 77. Consequently, the engagement claw 76a is released from the counter-engagement claw 52e so that the shutter 10 becomes movable. Incidentally, since the shutter 10 is urged by the shutter spring 54 toward the closed position, the shutter 10 is prevented from opening due to shutter release. When the shutter 10 is moved to the open position such as shown in FIGS. 3 and 5B, the openings 7 and 8 are opened and the hologram recording layer of the recording disk 4 is exposed to the outside through the cartridge 2.

Although detailed illustration is abbreviated, the lock mechanism 12 performs locking and lock-releasing similarly to and independently from the above-described lock mechanism 11. Thus, in order to release the shutter 10 locked in the closed position, it is necessary to simultaneously release the lock mechanisms 11 and 12. Accordingly, when the cartridge 2 is placed at the outside as it is, there is little possibility that the shutter 10 is mistakenly opened.

Figure 14:
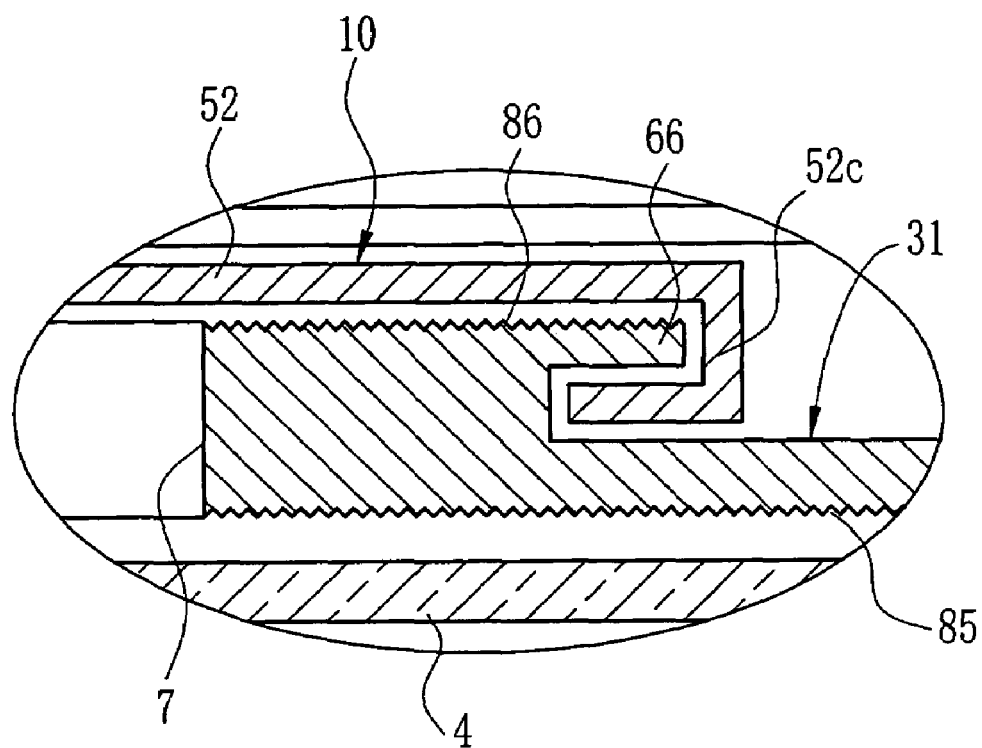
FIG. 14 is a section view showing a rough surface formed on an upper shell.
Figure 15:
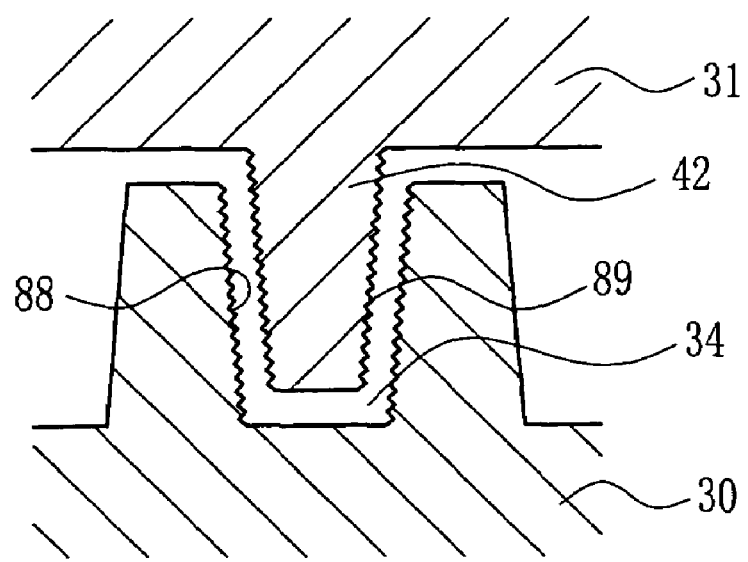
FIG. 15 is a section view showing rough surfaces formed on the convex and the concave.

As shown in FIG. 14, which is an enlarged view of a portion pointed by an arrow E in FIG. 5A, rough surfaces 85 and 86 are formed on the inner surface of the upper shell 31 and on the outer surface thereof confronting the shutter 10. The rough surfaces 85 and 86 are formed for the purpose of attenuating the light entering the cartridge 2 so that bad influence is minimized for the hologram recording layer of the recording disk 4. The rough surfaces 85 and 86 are also formed on the lower shell 30. Moreover, the rough surface 86 confronting the shutter 10 is formed inside the slits 60, 61, 62 and 63 of the lower and upper shells 30 and 31. Further, such as shown in FIG. 15, rough surfaces 88 and 89 may be formed on the inner surface of the first concave portion 34 of the lower shell 30 and the outer surface of the first convex portion 42 of the upper shell 31. Furthermore, the rough surface may be formed on the inner surfaces of the respective shutter plates 51 and 52 of the shutter 10.

Figure 16:
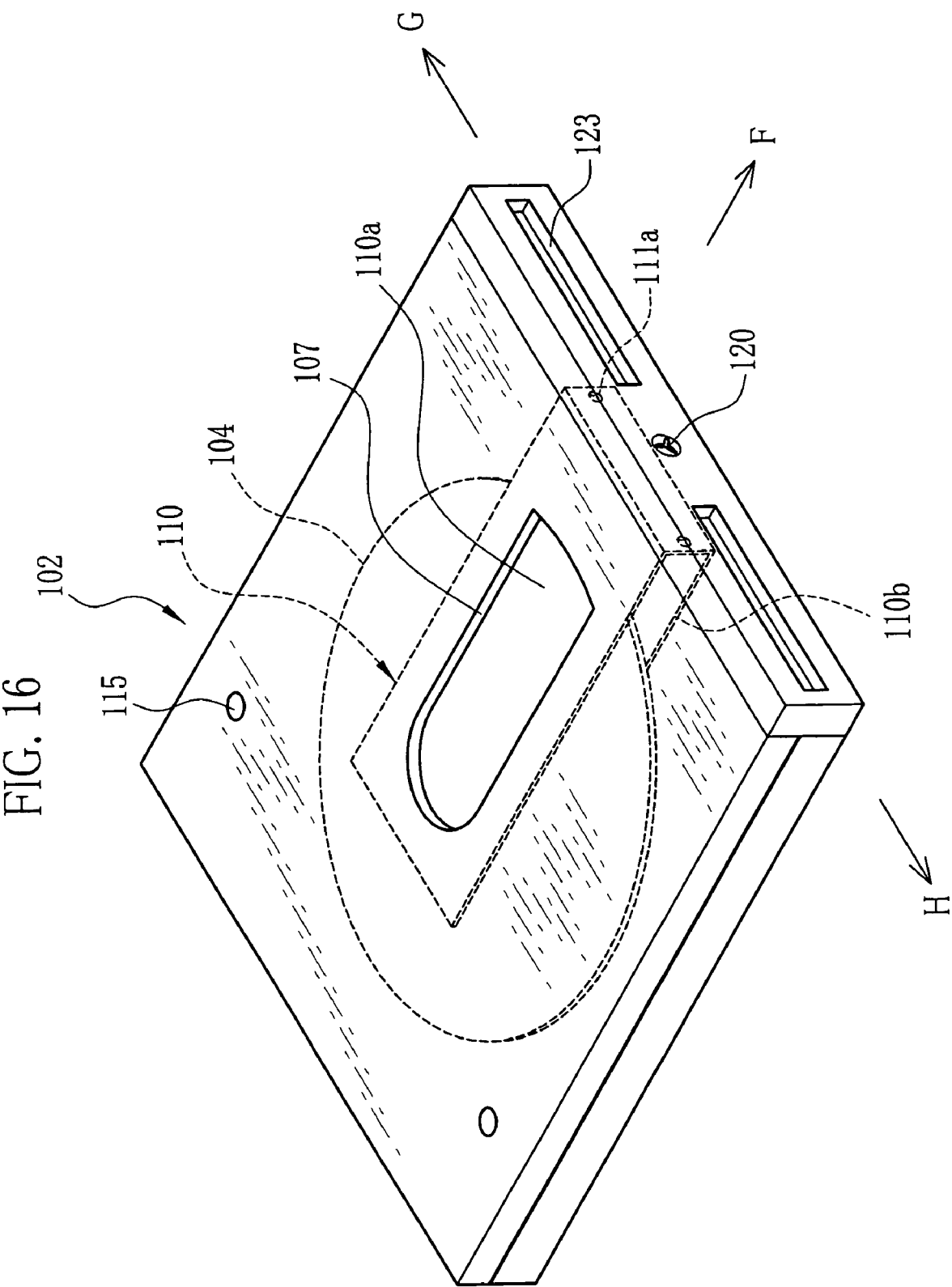
FIG. 16 is a perspective view showing a cartridge of a second embodiment.
Figure 17:
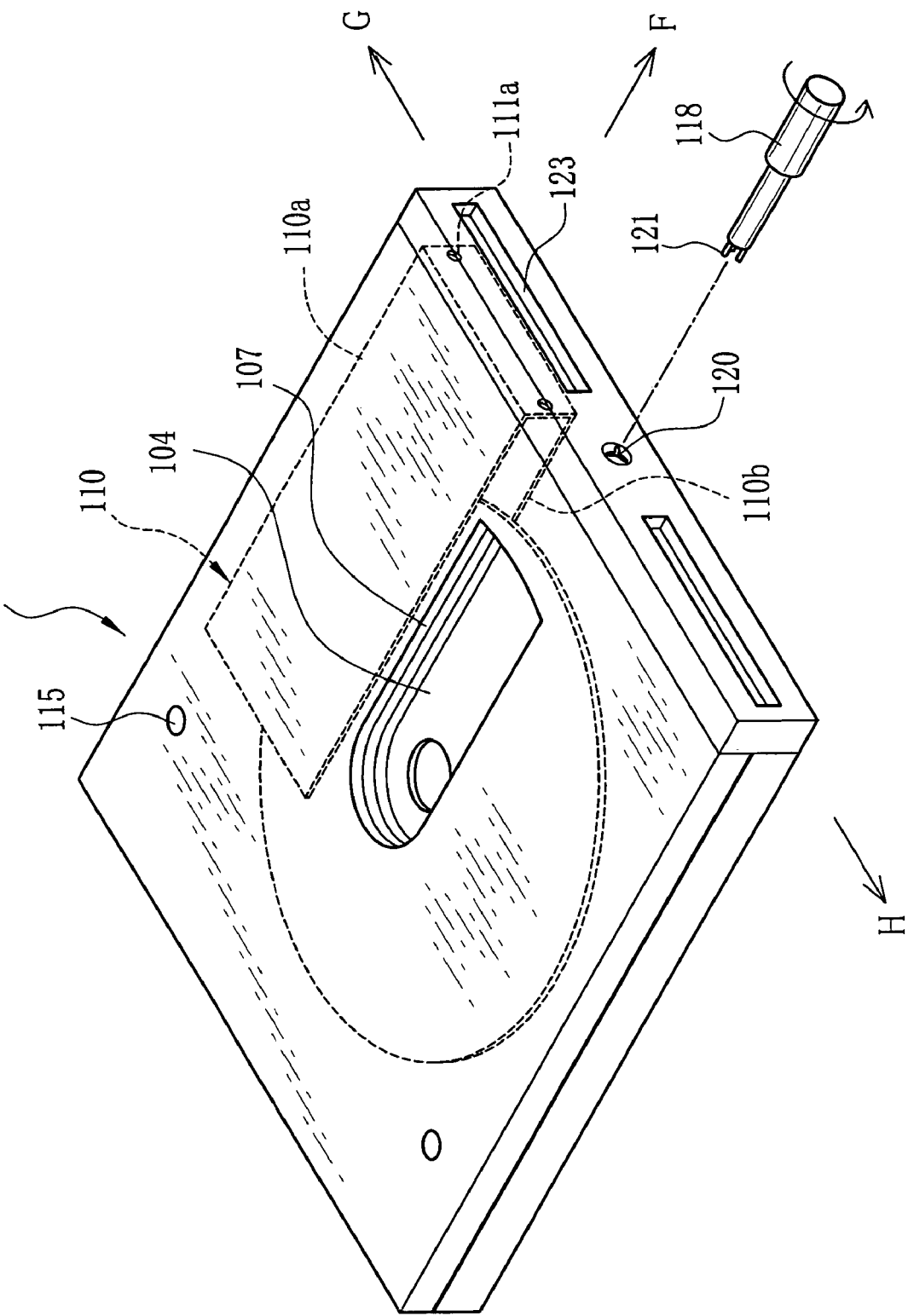
FIG. 17 is a perspective view showing a shutter open state of the cartridge.
Figure 18:
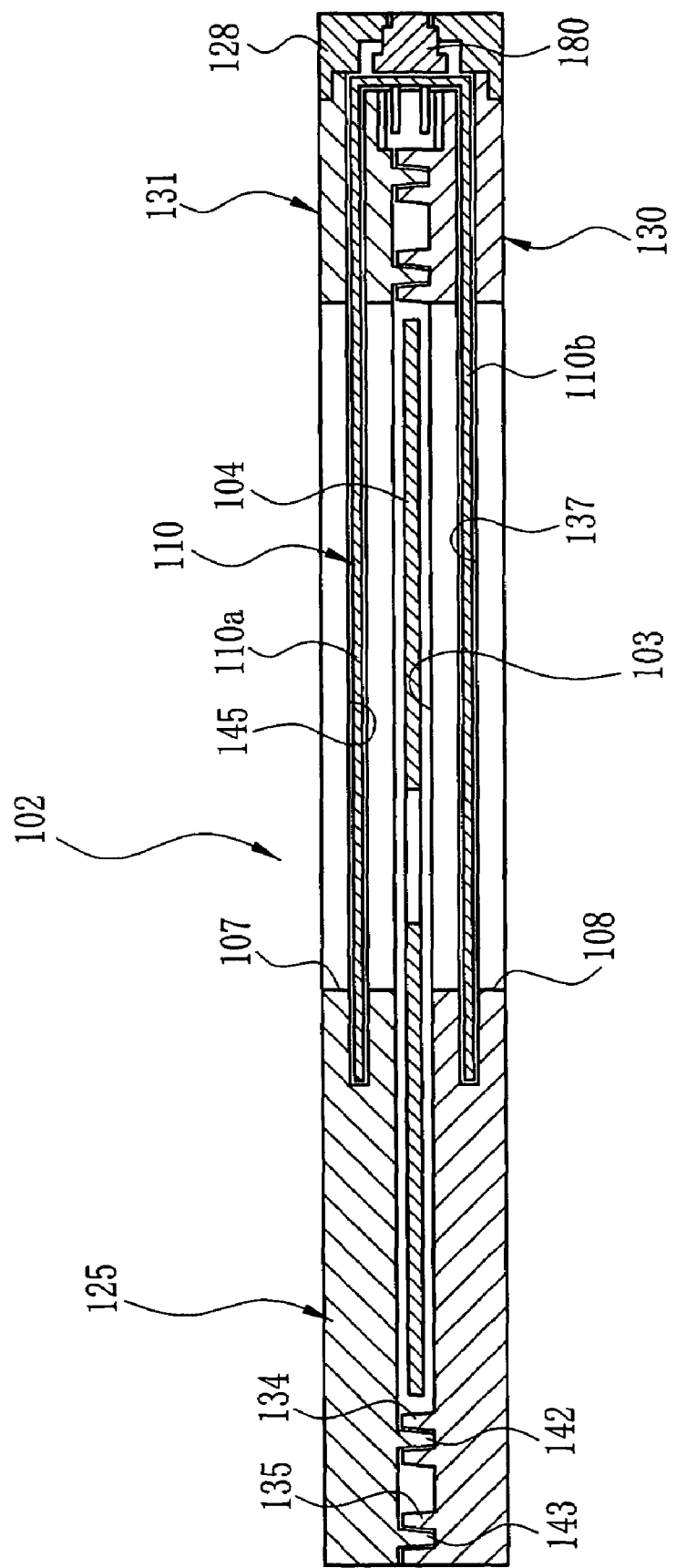
FIG. 18 is a section view of the cartridge in a loading direction thereof.

Next, a second embodiment of the cartridge according to the present invention is described below. FIGS. 16 and 17 are perspective views showing the cartridge 102 of the second embodiment. FIGS. 18 and 19 are partial section views of the cartridge 102 taken in a loading direction F and in a perpendicular direction thereto.

The cartridge 102 has a disk recess 103 formed therein. A recording disk 104 is rotatably contained in the disk recess 103. The recording disk 104 is contained in the cartridge 102 and is treated in this state.

The recording disk 104 has a hole formed at its central portion. Each surface of the recording disk 104 is provided with a hologram recording layer in which data is recorded in a multilayer manner as interference fringes of a laser beam. When the data is recorded in the recording disk 104, a wavelength of the laser beam to be used is within a region of green 532 nm to blue 405 nm, for example. Incidentally, a reinforcement member may be attached to the hole of the recording disk 104.

Openings 107 and 108 are formed in upper and lower surfaces of the cartridge 102 to expose the hologram recording layer of the recording disk 104, which is contained in the disk recess 103, to the outside. The openings 107 and 108 are closed by upper and lower shutter plates 110a and 110b of a shutter 110 movably contained in the cartridge 102. Upon moving the shutter 110 toward an open position in a direction shown by an arrow G or H, the openings 107 and 108 are opened. The shutter 110 is retained in a central closed position by a built-in neutral mechanism. Further, the shutter 110 is locked in the closed position by a lock mechanism. In virtue of these mechanisms, it is prevented that the shutter 110 is moved due to vibration, impact and so forth applied to the cartridge 102 to improperly open the openings 107 and 108.

The cartridge 102 is inserted into a recording device and a cartridge slot in a loading direction F. The recording device records the date in the recording disk 104. The cartridge slot is formed in a reproducing device for reading the data from the recording disk 104. The cartridge 102 loaded in the recording device and the reproducing device is positioned by positioning holes 115 formed in both surfaces of the cartridge 102, and the shutter 110 is moved to the open position to open the openings 107 and 108. For example, when the cartridge 102 is loaded in the device in a state of FIG. 16, a pick-up unit of the device is inserted through the lower opening 108 into the cartridge 102 to record the data in the lower hologram recording layer of the recording disk 104 or to reproduce the data recorded in the lower hologram recording layer thereof. Meanwhile, when the cartridge 102 is loaded in the device in a reverse state, the pick-up unit is inserted through the opening 107, which is currently positioned at the lower side, to record the data in the hologram recording layer of the upper surface of the recording disk 104 shown in FIG. 17, or to reproduce the data recorded in the upper surface of the recording disk 104 shown in FIG. 17.

The recording device and the reproducing device include a lock-releasing mechanism for releasing the lock mechanism of the cartridge 102, and a shutter opening mechanism for moving the shutter 110 between the closed position and the open position. As shown in FIG. 17, the lock-releasing mechanism moves a releasing jig 118 in an axial direction inside the device to engage this jig 118 with an engagement part 120, which is formed on an end surface of the cartridge 102 in the loading direction F to release the lock mechanism. The engagement part 120 has a trifurcate shape, for example, and the releasing jig 118 has three engagement pins 121 so as to be capable of easily engaging with the engagement part 120.

The releasing jig 118 engages with the engagement part 120, and then is rotated in a counterclockwise direction to release the lock mechanism. Successively, the shutter opening mechanism inserts a drive pin into a slit 123, which is formed in a front side of the shutter 110 in the loading direction F, and engages this pin with an engagement hole 111a of the shutter 110 to move the shutter 110 in the opening direction G or H. In virtue of this, the shutter 110 is slid to open the openings 107 and 108 of both surfaces of the cartridge 102 such as shown in FIG. 19B.

Figure 20:
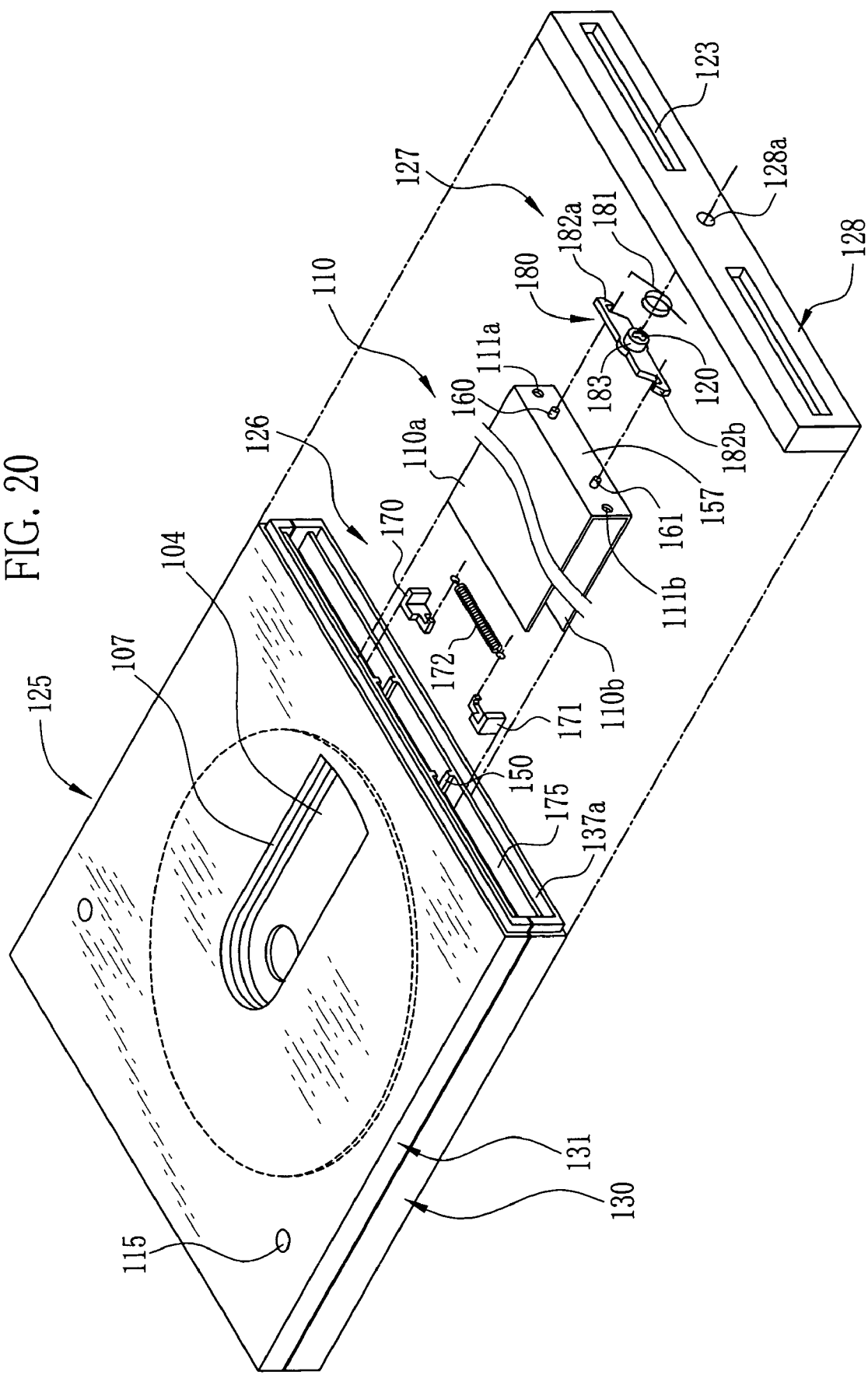
FIG. 20 is an exploded perspective view showing a structure of the cartridge.

FIG. 20 is an exploded perspective view showing a structure of the cartridge 102 comprising a cartridge body 125, the shutter 110, the neutral mechanism 126, the lock mechanism 127 and a front fitting part 128. The cartridge body 125 rotatably contains the recording disk 104. The shutter 110 opens and closes the openings 107 and 108, which are formed in both surfaces of the cartridge body 125, from the outside. The neutral mechanism 126 and the lock mechanism 127 are incorporated in the cartridge body 125. The front fitting part 128 is fitted to the front of the cartridge body 125 in the loading direction F to close the cartridge body 125.

Figure 21:
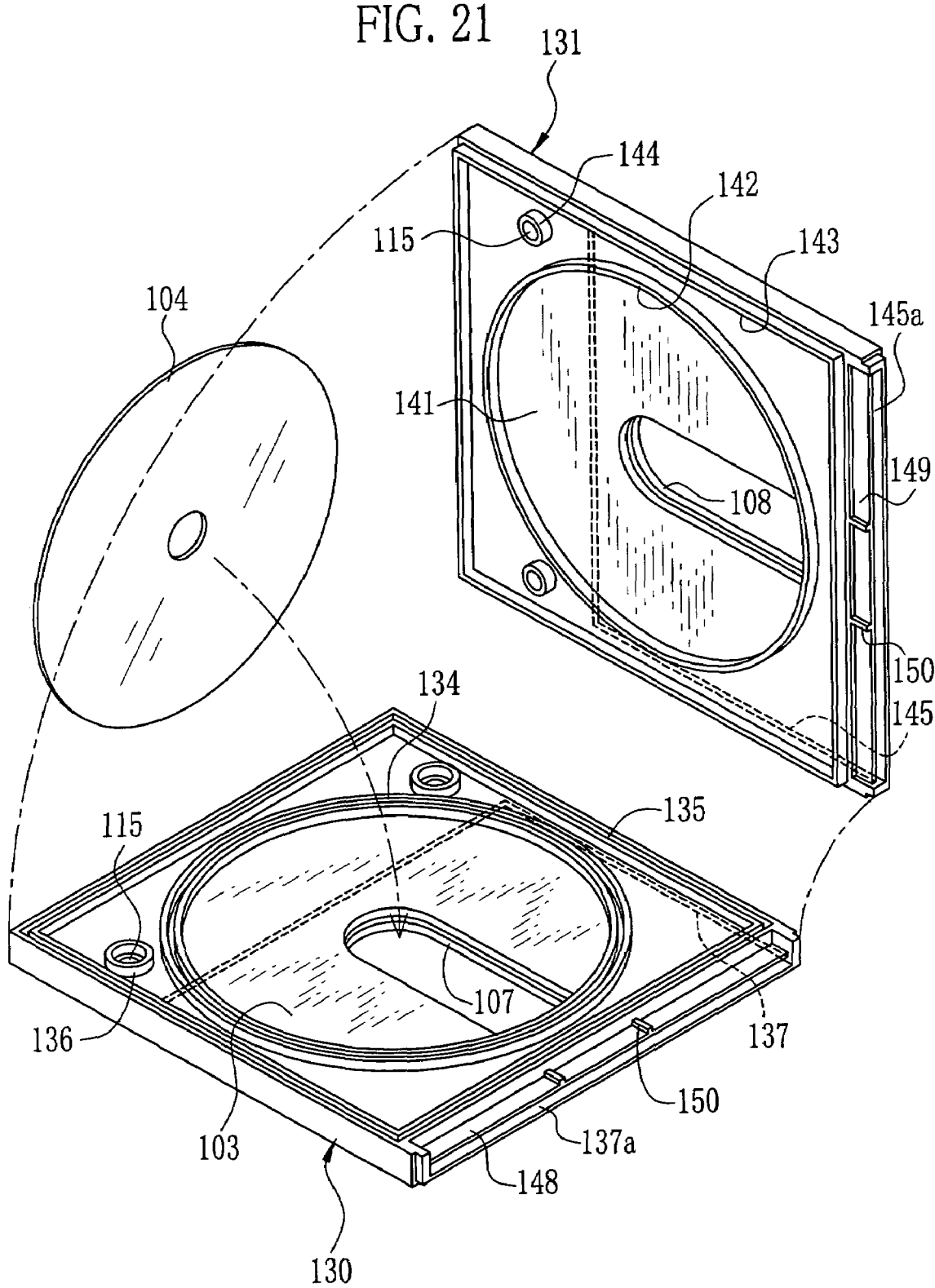
FIG. 21 is an exploded perspective view showing a structure of a cartridge body.

As shown in FIG. 21, the cartridge body 125 is composed of a lower shell 130 having a plate-like shape, and an upper shell 131 joined to an upper face of the lower shell 130. The lower shell 130 and the upper shell 131 are made of identical or similar thermoplastic in which light-shielding substance and lubricant are added. The light-shielding substance improves light shielding performance and physical strength. The lubricant improves sliding of the shutter 110. Since the light-shielding substance and the lubricant are identical with those of the foregoing first embodiment, detailed description thereof is abbreviated. In this embodiment, the lower shell 130 is referred to as a first shell and the upper shell 131 is referred to as a second shell. However, the first and second shells may be reversed.

An inner surface of the lower shell 130 is provided with the circular disk recess 103, a first concave portion 134, a second concave portion 135, alight-shielding fence 136 and a shutter container 137. The disk recess 103 contains the recording disk 104. The first concave portion 134 protrudes so as to surround the disk recess 103. The second concave portion 135 is disposed along entire edges. The light-shielding fence 136 surrounds the periphery of the positioning hole 115. The shutter container 137 is disposed between the outer surface of the lower shell 130 and the disk recess 103 to contain the lower shutter plate 111b of the shutter 110. The front of the shutter container 137 in the loading direction F is provided with an opening 137a being as a loading slot for the lower shutter plate 110b.

Meanwhile, an inner surface of the upper shell 131 is provide with an upper surface 141 constituting an upper portion of the disk recess 103 of the lower shell 130. The inner surface of the upper shell 131 is further provided with a first convex portion 142, a second convex portion 143, a light-shielding fence 144 and a shutter container 145. The first convex portion 142 is inserted into the first concave portion 134 of the lower shell 130. The second convex portion 143 is inserted into the second concave portion 135. The light-shielding fence 144 is disposed so as to surround the periphery of the positioning hole 115 and is inserted into the light-shielding fence 136. The shutter container 145 contains the upper shutter plate 110a of the shutter 110. Similarly to the shutter container 137 of the lower shell 130, the shutter container 145 is disposed between the outer surface of the upper shell 131 and the upper portion 141. The front of the shutter container 145 in the loading direction F is provided with an opening 145a being as a loading slot for the upper shutter plate 110a.

Front edges of the lower and upper shells 130 and 131 are respectively provided with cutouts 148 and 149 forming a groove-like space in which the neutral mechanism 126 is contained. The inside of the cutouts 148 and 149 is integrally formed with four stoppers 150 composing a part of the neutral mechanism 126.

Figure 22:
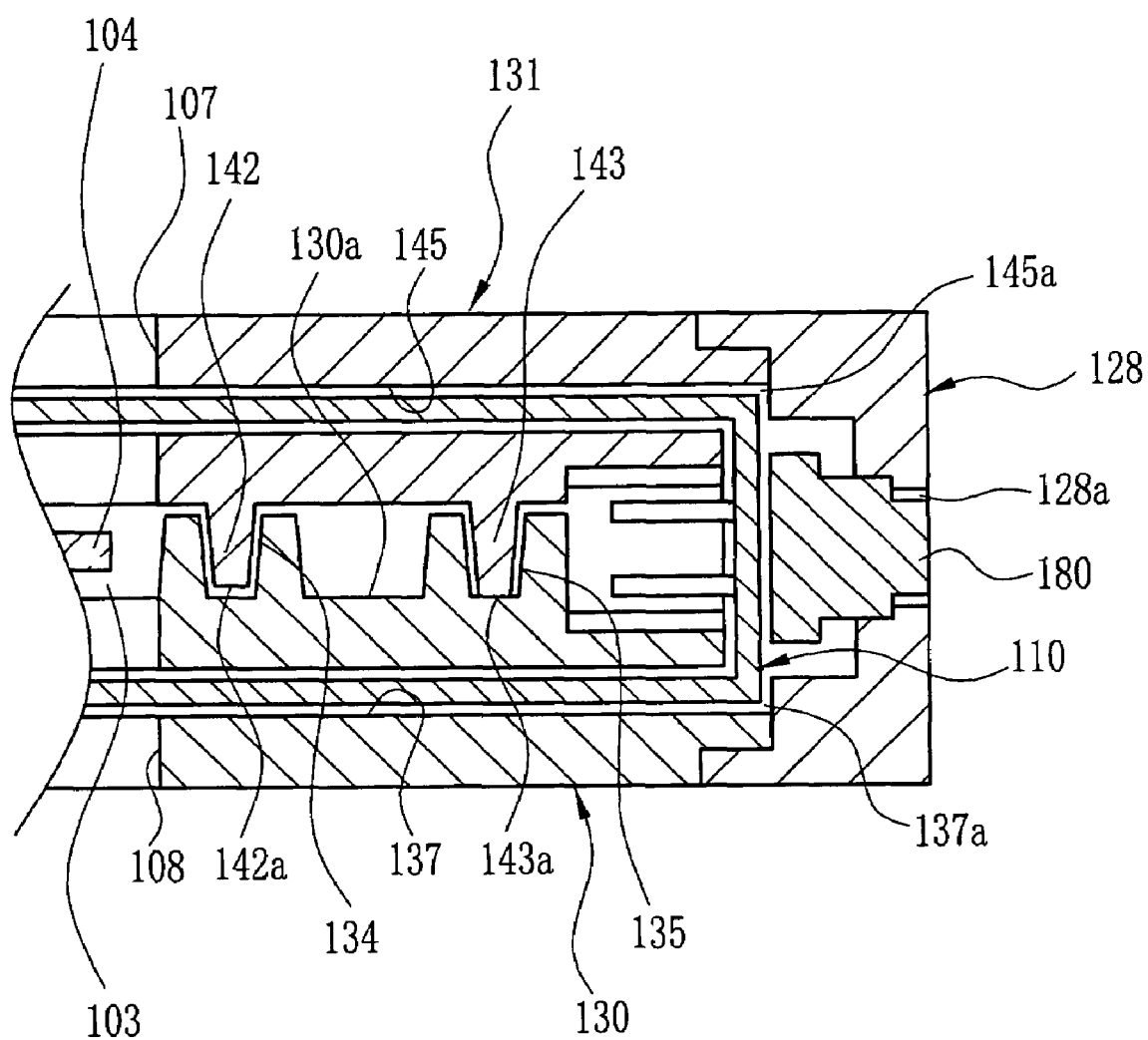
FIG. 22 is a partial section view showing a structure of a top side of the cartridge in the loading direction.

FIG. 22 is a partial section view showing a front side of the cartridge 102 in the loading direction. Also in this second embodiment, the periphery of the disk recess 103 is surrounded by a labyrinth-like light-shielding structure such as shown in FIG. 22. Thus, it is prevented that light and dust enter the disk recess 103 through a joint portion of the lower and upper shells 130 and 131. By ultrasonically welding the second convex portion 143 to an inner surface 130a of the lower shell 130, the lower and upper shells 130 and 131 are securely joined similarly to the first embodiment, and there is no gap at the joint portion of them.

In a case that ultrasonic welding is performed for the lower and upper shells 130 and 131 after incorporating the shutter 110, the lock mechanism 127 and so forth in the cartridge body 125, sometimes the other parts of the shutter 110 and so forth are welded at the same time. In order to prevent this, a different kind of plastic from the lower shell 130 and the upper shell 131 may be used as the material of the other parts of the shutter 110 and so forth.

For the purpose of securely joining the lower and upper shells 130 and 131 by means of ultrasonic welding, the top 143a of the second convex portion 143 may be provided with a protruding energy director. By the way, ultrasonic welding of the lower and upper shells 130 and 131 may be performed for the entire second convex portion 143. Alternatively, ultrasonic welding may be performed in a spot form at regular intervals.

The shutter 110 is made of a different kind of plastic from the lower and upper shells 130 and 131. Similarly to the first embodiment, the light-shielding substance and the lubricant may be added. The shutter 110 comprises a base 157, the upper shutter plate 110a and the lower shutter plate 110b. The base 157 is placed at the edge of the cartridge body 125 in the loading direction F. The upper and lower shutter plates 110a and 110b are respectively inserted into the shutter containers 145 and 137 of the upper and lower shells 131 and 130.

Figure 23A:
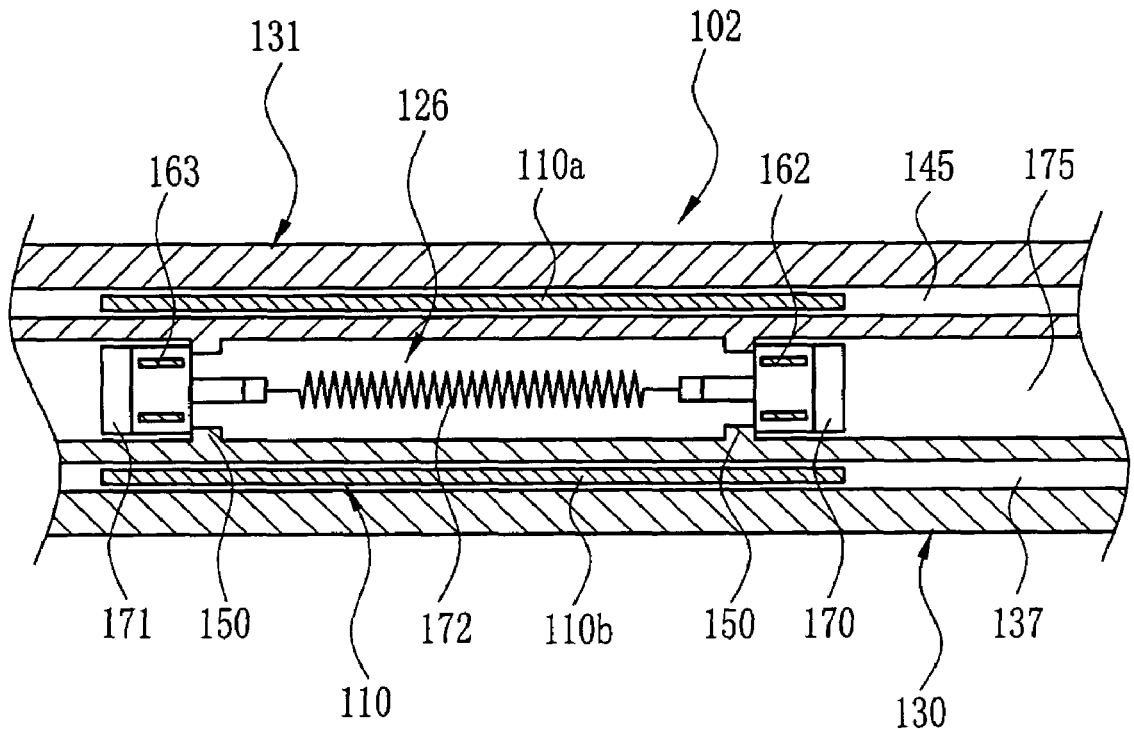
FIGS. 23A and 23B are illustrations for explaining an operation of a neutral mechanism.

An outer surface of the base 157 is provided with symmetrically-formed engagement holes 111a and 111b, which are used at a time when the shutter 110 is opened. Moreover, the outer surface of the base 157 is provided with symmetrically-formed pins 160 and 161 to be locked by the lock mechanism 127. As shown in FIG. 23A, an inner surface of the base 157 is provided with a pair of regulation pieces 162 and 163 connected to the neutral mechanism 126. The regulation pieces 162 and 163 are symmetrically located near both edges of the base 157.

The shutter 110 moves the upper and lower shutter plates 110a and 110b inside the shutter container 145 and 137 to open and close the openings 107 and 108. The upper and lower shutter plates 110a and 110b are sufficiently larger than the openings 107 and 108. The upper and lower shutter plates 110a and 110b form the labyrinth-like light-shielding structure with the shutter containers 145 and 137. Thus, it is possible to effectively prevent light and dust from entering through the openings 107 and 108. Incidentally, since the lubricant is added in the raw materials of the lower shell 130, the upper shell 131 and the shutter 110, it is prevented that shavings are caused due to friction at the time of movement of the shutter 10.

The neutral mechanism 126 comprises a pair of slid members 170, 171 and a spring 172 for connecting these slide members. As shown in FIG. 23A, the slide members 170 and 171 are slidably inserted into a groove 175, which is composed of the cutouts 148 and 149 formed in the lower and upper shells 130 and 131, so as to be positioned at the outside of the stoppers 150. The slide members 170 and 171 abut on the respective stoppers 150 by virtue of urging force of the spring 172. The regulation pieces 162 and 163 of the shutter 110 are interposed between the respective slide members 170, 171 and the stoppers 150. The regulation pieces 162 and 163 abut on the slide members 170 and 171, which are halted by the urging force of the spring 172, to locate the shutter 110 at the central closed position.

Figure 23B:
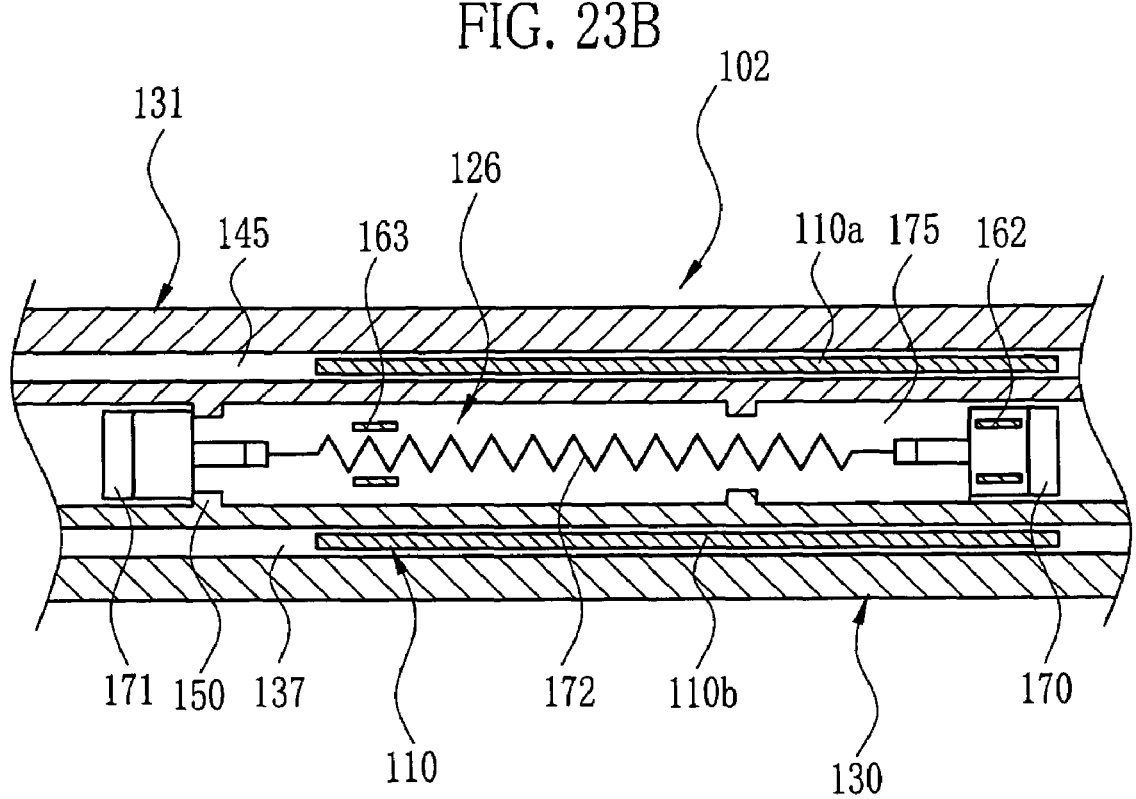

For example, such as shown in FIG. 23B, when the shutter 110 is slid in the right direction in the drawing, the right regulation piece 162 presses the slid member 170 against the spring 172 to slide this member 170 in the groove 175. The other slide member 171 abuts on the stopper 150 without moving. Upon terminating the slide operation of the shutter 110 in this state, the slid member 170 urged by the spring 172 presses the regulation piece 162 to move the shutter 110 to the central closed position.

The lock mechanism 127 comprises a lock lever 180 rotatably contained in the front fitting part 128, and a lock spring 181. The lock lever 180 comprises engagement claws 182a and 182b formed at both ends thereof, a pivot 183 rotatably inserted into a bearing formed in the front fitting part 128, and the above-mentioned engagement part 120, which is exposed to the outside through an opening 128a formed in the front fitting part 128.

The lock spring 181 comprises a torsion spring and is fitted to the pivot 183. One end of the lock spring 181 is put on the lock lever 180 and the other end thereof abuts on the inside of the front fitting part 128 so that the lock lever 180 is urged in a clockwise direction in the drawing.

Figure 24A:
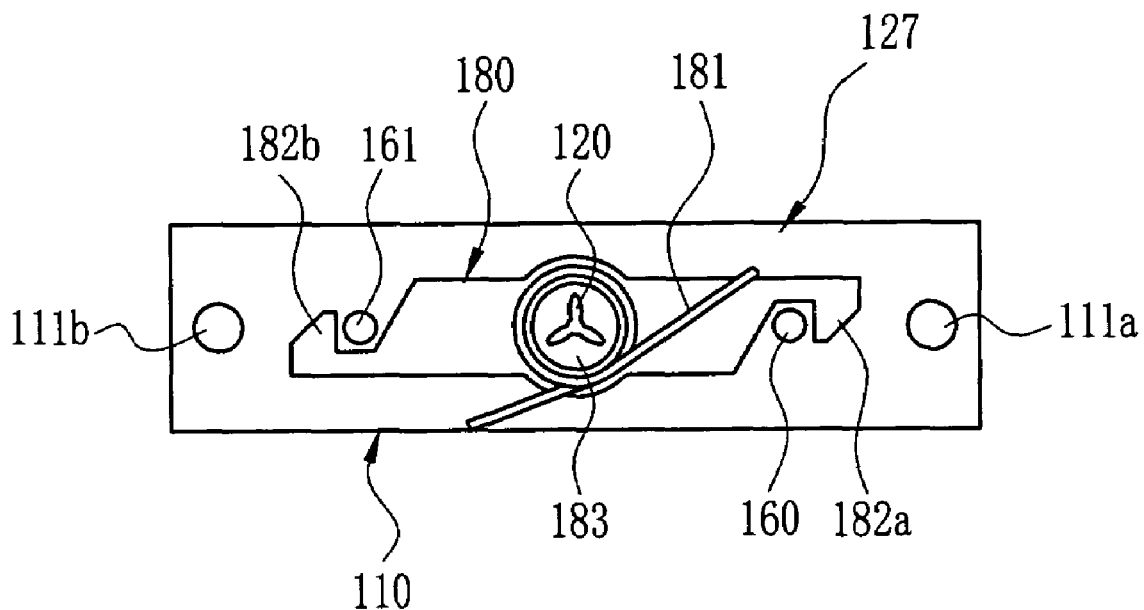
FIGS. 24A and 24B are illustrations for explaining an operation of the lock mechanism.

FIG. 24A is a schematic illustration showing a lock state of the lock mechanism 127. When the shutter 110 is kept in the closed position such as shown in FIGS. 16 and 19A, the engagement claws 182a and 182b respectively engage with the pins 160 and 161 of the shutter 110 by means of the lock spring 181. Thus, moving the shutter 110 in the opening direction is regulated and it is prevented that the shutter 110 is improperly opened to expose the recording disk 104.

Figure 24B:
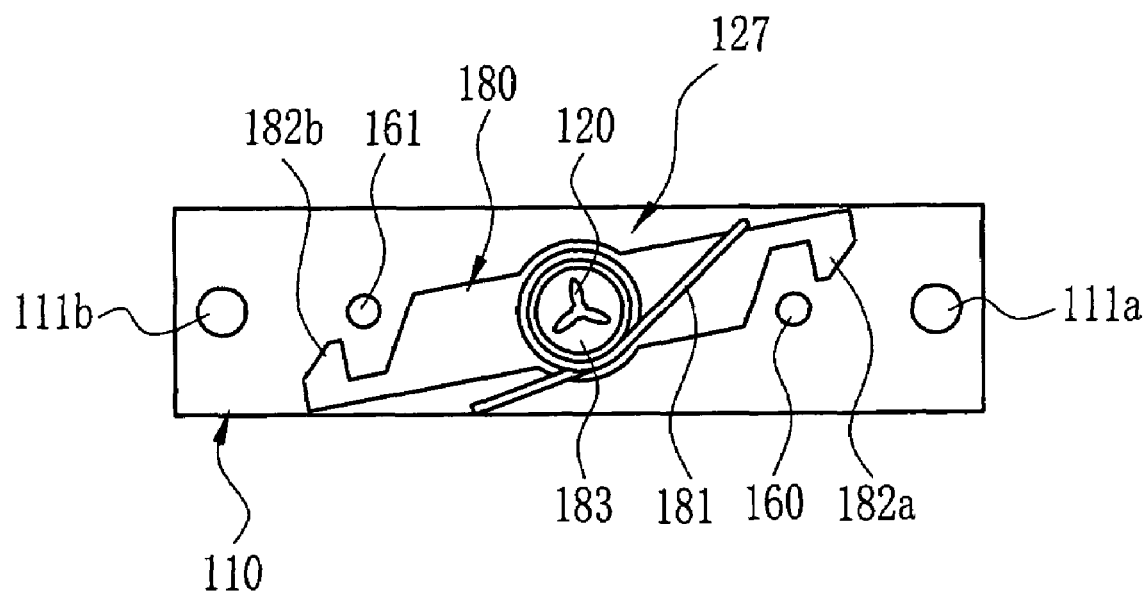

FIG. 24B shows a lock-release state of the lock mechanism 127. When the engagement part 120 is rotated by the releasing jig 118 in the counterclockwise direction, namely in the releasing direction, such as shown in FIG. 17, the lock lever 180 is also rotated in the counterclockwise direction against the lock spring 181. Consequently, the engagement claws 182a and 182b are released from the pins 160 and 161 so that the shutter 110 becomes movable. Incidentally, since the shutter 110 is urged by the neutral mechanism 126 to the closed position, it is prevented that the shutter 110 is opened due to the lock release. Such as shown in FIGS. 17 and 19B, when the shutter 110 is moved to the open position, the openings 107 and 108 are opened to expose the hologram recording layer of the recording disk 104 through the cartridge 102.

As to the lock mechanism 127, the engagement part 120 is located at a central axis around which both faces of the cartridge 102 are reversed. Further, the openings 107 and 108 are adapted to be opened by moving the shutter 110 from the central closed position in either direction of the right and left directions. Thus, even if which face of the cartridge 102, loaded into the device directs upward, it is possible to use the common lock-releasing mechanism and the common shutter-opening mechanism. In virtue of this, the device for using the cartridge 102 may be simplified and its cost may be reduced.

Also in the cartridge 102 of the second embodiment, it is preferable that a rough surface is formed on the inner surface of the disk recess 103. Moreover, a rough surface may be formed on the insides of the shutter containers 137 and 145, the inner surface of the first concave portion 134, the outer surface of the first convex portion 142, and the respective shutter plates 110a and 110b of the shutter 110. In this embodiment, the lower and upper shells 130 and 131 are respectively composed of the sole part. However, the respective shells may be formed by combining a plurality of parts. For instance, the respective shells may be composed of two parts divided on the shutter container. In this case, a mold may be simplified.

EXAMPLE

Next, examples of the present invention are described below. As to the thermoplastic for forming the upper shell and the lower shell, it is possible to use PBT, ABS, POM, PS, PP, HDPE, PA, PET, PPS, SAN (styrene-acrylonitrilecopolymer), PMMA, PC and so forth. Meanwhile, with respect to the other parts except the upper and lower shells, it is desirable to select the different one, which is not used for the upper and lower shells, from among the above-noted thermoplastics for the purpose of preventing false ultrasonic welding.

It is preferable for the upper and lower shells to use a plastic having light-shielding properties of which visible-ray transmittance is 1.0% or less when a thickness is 0.2 mm. Further, it is preferable that the thickness is within a range of 0.2 to 1.6 mm in order to obtain necessary physical strength. For the purpose of obtaining the plastic having the above-mentioned light-shielding properties, various kinds of light-shielding substances may be added. It is preferable to add the light-shielding substance by 0.01 to 5.00 wt. % in accordance with the one to be used. As the light-shielding substances, there are the following.

(1) Inorganic Compound

A. Oxide . . . silica, diatomous earth, alumina, titanium oxide, iron oxide(iron black), zinc oxide, magnesium oxide, antimony oxide, barium ferrite, strontium ferrite, beryllium oxide, pumice stone, pumice stone balloon, alumina fiber, and so forth.

B. Hydroxide . . . aluminum hydroxide, magnesium hydroxide, basic magnesium carbonate, and so forth.

C. Carbonate . . . calcium carbonate, magnesium carbonate, dolomite, dawsonite, and so forth.

D. Sulfate (Subsulfate) . . . calcium sulfate, barium sulfate, ammonium sulfate, calcium sulfite, and so forth.

E. Silicate . . . talc, clay, mica, asbestos, glass fiber, glass balloon, glass beads, calcium silicate, montmorillonite, bentonite, and so firth.

F. Carbon . . . carbon black, graphite, carbon fiber, carbon hollow sphere, and so forth.

G. Others . . . iron powder, copper powder, lead powder, aluminum powder, molybdenum sulfide, boron fiber, silicon carbide fiber, brass fiber, potassium titanate, lead titanate zirconate, zinc borate, barium metaborate, calcium borate, sodium borate, aluminum paste, talc, and so forth.

(2) Organic Compound wood flour (pine, oak, sawdust and so forth), grain fiber (almond, peanut, chaff and so forth), cotton, jute, fine pieces of paper, non-wood fiber (straw, kenaf, bamboo, esparto, mulukhiya, firework and so forth), cellophane piece, nylon fiber, polypropylene fiber, starch (including denatured starch, surface treatment starch), aromatic polyamide fiber, and so forth.

Among the above light-shielding substances, the inorganic compound is preferable since this compound hardly causes a negative effect on the recording disk and is opaque in a thermally stable state at 150° C. or more. Especially, carbon black, titanium nitride, graphite, and iron black are preferable since these substances are excellent in heat resistance and light resistance, and are comparatively inactive.

When the carbon black is used as the light-shielding substrate, it is preferable that an amount of the carbon black to be added is 0.01 to 2.00 wt. %. This is for obtaining the plastic having a good balance regarding the light-shielding properties and the physical strength.

As to classification of the carbon black in accordance with its raw material, there are gas black, furnace black, channel black, anthracene black, acetylene black, Ketjen carbon black, thermal black, lamp black, soot, turpentine soot, animal black, vegetable black, and so forth.

Regarding representative examples of marketed production of the preferred carbon black, there are carbon black #20(B), #30(B), #33(B), #40(B), #41(B), #44(B), #45(B), #50, #55, #100, #600, #950, #1000, #2200(B), #2400(B), MA8, MA11, MA100 and so forth manufactured by Mitsubishi Chemical Corporation. Moreover, it is also possible to use Denka Black manufactured by Denki Kagaku Kogyo, Seast manufactured by Tokai Carbon Co., Ltd., Asahi #78 manufactured by Asahi Carbon Co. Ltd., Showablack manufactured by Showa Cabot K. K., Niteron manufactured by Nippon Steel Chemical, Diablack manufactured by Mitsubishi Chemical Corporation, and so forth.

Besides the above, there are products manufactured by Cabot Corporation, for instance, Black Pearls 2, 46, 70, 71, 74, 80, 81, 607 and so forth, Regal 300, 330, 400, 660, 991, SRF-S and so forth, Vulcan 3, 6 and so forth, Sterling 10, SO, V, S, FT-FF, MT-FF and so forth.

Further, there are United R, BB, 15, 102, 3001, 3004, 3006, 3007, 3008, 3009, 3011, 3012, XC-3016, XC-3017, 3020 and so forth manufactured by Ashland Chemical Company. However, the present invention is not limited to the above-noted products.

Meanwhile, as to the lubricant to be added to the upper shell, the lower shell and the shutter, it is possible to use silicone-based lubricant, especially, dimethylpolysiloxane of various grades. For instance, it is possible to use various grades marketed by Dow Corning Toray Silicone Co., Ltd., GE Toshiba Silicone Co., Ltd., Wacker Asahikasei Silicone Co., Ltd., Shin-Etsu Chemical Co., Ltd. and so forth. Incidentally, it is possible to use both of master batch and kneaded product. With respect to an amount of the silicone-based lubricant to be added, a range of 0.1 wt. % to 5.0 wt. % is preferable in order to obtain the plastic having a good balance regarding friction resistance, product quality and manufacture qualification.

As to the rough surface formed on the shell, if surface roughness Ra thereof is 5 μm or less, light diffusion effect is not sufficiently exerted. If the surface roughness Ra is 20 μm or more, the rough surface is likely to scratch the recording disk when coming into contact therewith. In view of this, it is preferable that mat processing or emboss processing is performed so as to make the surface roughness Ra 5 μm to 20 μm.

The cartridges 2 and 102 of the first and second embodiments were actually produced. Experiment concerning light shielding performance and dustproof performance was carried out for the produced cartridges and a conventional cartridge (comparative example), which is described in Japanese Patent Laid-Open Publication No. 2003-317422. A method and evaluation criteria of the experiment are as follows. Moreover, materials of the parts of the upper and lower shells, the shutter and so forth are as follows. Further, materials of the respective cartridges and experimental results are shown in the following Table 1.

[Experiment Concerning Light Shielding Performance]

Inspection light of 100,000 Lux was applied to the respective faces of the cartridge for three minutes, and recording properties of the photo polymer were inspected.

[Evaluation Criteria of Experiment Concerning Light Shielding Performance]

◎: There is no problem regarding the recording properties of the photo polymer.

×: There are problems regarding the recording properties of the photo polymer.

[Experiment Concerning Dustproof Performance]

The recording disk was spun in the cartridge by one million rotations (rotating speed was 5,000 rpm). After that, a number of remaining wastes of which length was 0.1 mm or more was inspected.

[Evaluation Criteria of Experiment Concerning Dustproof Performance]

◎: 0 to 5, ○: 6 to 10, Δ: 11 to 20, ×: 21 or more

[Material]

ABS: Denka Multipurpose Grade GR-0500

POM: Mitsubishi Engineering-Plastics Corporation Iupital Enhancement/Filling Grade FG2025

TABLE 1

| | | First Example | Second Example | Comparative Example |
|---|---|---|---|---|
| Material | Upper/Lower Shell | ABS | ABS | ABS |
| | Other Parts | POM | POM | POM |
| | Silicone (Wt. %) | 2.0 | 2.0 | 0 |
| | CB (Wt. %) | 0.30 | 0.30 | 0 |
| Evaluation Result | Light Shielding Performance | ◎ | ◎ | X |
| | Dustproof Performance | ◎ | ◎ | X |

As will be apparent from the experimental results shown in Table 1, the cartridge of the comparative example had bad results regarding both of the light shield experiment and the dustproof experiment. The light shielding performance and the dustproof performance were hardly maintained for the recording disk contained in the cartridge of the comparative example. By comparison, the cartridges of the first and second embodiments had good results regarding both of the light shield experiment and the dustproof experiment, and the contained recording disk was properly protected.

In the above examples, the shutters 10 and 110 are made of the plastic. However, the shutter may be made of a metal of aluminum base alloy, stainless steel and so forth. Moreover, in the above embodiments, the concave portion and the convex portion engage with each other to form the light-shielding structure. However, the light-shielding structure may be obtained by closely engaging two light-shielding fences.

Further, although the upper and lower shells are fixed by ultrasonic welding, other welding methods and fixing methods may be adopted. For instance, the upper and lower shells may be fixed by a screw or the like. In this case, it is preferable to form the light-shielding structure around a screw hole as well.

Furthermore, the cartridge contains the recording disk, both surfaces of which are recordable. However, the cartridge may contain another recording disk, one surface of which is recordable. In this case, an opening is formed in only one side of the cartridge, and the shutter opens and closes this opening. Moreover, although the cartridge contains the hologram recording medium, the present invention may be adopted to another cartridge containing a recording medium having other photosensitivity.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A cartridge for containing a disk-shaped photosensitive recording medium, comprising:
    a cartridge body for rotatably containing said photosensitive recording medium so as to interpose this medium;
    at least one opening formed in said cartridge body, said photosensitive recording medium being exposed to the outside through said opening;
    a shutter movably attached to said cartridge body, said shutter moving between a closed position for closing said opening and an open position for unclosing said opening; and
    at least one slit formed in said cartridge body, the edge of said shutter being inserted into said slit when said shutter is kept in said closed position,
    wherein the edge of said shutter is separated from said slit when said shutter is moved to an open position.

2. A cartridge according to claim 1, wherein one of mat processing and emboss processing is performed on an inner surface of said cartridge body confronting said photosensitive recording medium and an outer surface thereof confronting said shutter, so as to make surface roughness 5 to 20 μm.

3. A cartridge according to claim 1, wherein said cartridge body comprises a first shell substantially having a plate shape, and a second shell superposed on and welded to said first shell, said first and second shells being made of one of plastic, same thermoplastic and similar thermoplastic, and other parts including said shutter being made of different material from said first and second shells.

4. A cartridge according to claim 3, wherein said first shell, said second shell and said shutter are made of plastic in which light-shielding substance is added by 0.01 to 5.00 wt. %.

5. A cartridge according to claim 3, wherein said first shell, said second shell and said shutter are made of plastic in which carbon black is added by 0.01 to 2.00 wt. %.

6. A cartridge according to claim 3, wherein said first shell, said second shell and said shutter are made of plastic in which silicone-based lubricant is added by 0.1 to 5.0 wt. %.

7. A cartridge according to claim 1, wherein said photosensitive recording medium is a hologram recording medium.

8. A cartridge according to claim 1, wherein said opening is formed in each of both faces of said cartridge body.

9. A cartridge according to claim 8, wherein said shutter comprises a first shutter plate and a second shutter plate for closing and unclosing said openings respectively, and the edge of each shutter plate is inserted into said slit.

10. A cartridge according to claim 1, further comprising:
   at least one concave portion provided on a lower shell of said cartridge body; and
   at least one convex portion provided on an upper shell of said cartridge body,
   wherein a respective one of said at least one convex portion is inserted into a respective one of said at least one concave portion.

11. A cartridge for containing a disk-shaped photosensitive recording medium, comprising:
   a cartridge body for rotatably containing said photosensitive recording medium so as to interpose this medium;
   at least one opening formed in said cartridge body, said photosensitive recording medium being exposed to the outside through said opening;
   a shutter movably attached to said cartridge body, said shutter moving between a closed position for closing said opening and an open position for unclosing said opening;
   a groove formed at an end portion of said shutter; and
   a ridge formed on said cartridge body, said ridge being inserted into said groove when said shutter is kept in said closed position,
   wherein said ridge is separated from said groove when said shutter is moved to an open position.

12. A cartridge according to claim 11, wherein said groove is formed at a front side of said shutter in a direction moving toward said open position.

13. A cartridge according to claim 12, further comprising:
   at least one slit formed in said cartridge body, the edge of said shutter being inserted into said slit when said shutter is kept in said closed position.

14. A cartridge according to claim 11, wherein one of mat processing and emboss processing is performed on an inner surface of said cartridge body confronting said photosensitive recording medium and an outer surface thereof confronting said shutter, so as to make surface roughness 5 to 20 μm.

15. A cartridge according to claim 11, wherein said cartridge body comprises a first shell substantially having a plate shape, and a second shell superposed on and welded to said first shell, said first and second shells being made of one of plastic, same thermoplastic and similar thermoplastic, and other parts including said shutter being made of different material from said first and second shells.

16. A cartridge according to claim 15, wherein said first shell, said second shell and said shutter are made of plastic in which light-shielding substance is added by 0.01 to 5.00 wt. %.

17. A cartridge according to claim 15, wherein said first shell, said second shell and said shutter are made of plastic in which carbon black is added by 0.01 to 2.00 wt. %.

18. A cartridge according to claim 15, wherein said first shell, said second shell and said shutter are made of plastic in which silicone-based lubricant is added by 0.1 to 5.0 wt. %.

19. A cartridge according to claim 11, wherein said photosensitive recording medium is a hologram recording medium.

20. A cartridge according to claim 11, wherein said opening is formed in each of both faces of said cartridge body.

21. A cartridge according to claim 20, wherein said shutter comprises a first shutter plate and a second shutter plate for closing and unclosing said openings respectively, and said groove is formed at the end portion of each shutter plate.

22. A cartridge according to claim 11, further comprising:
   at least one concave portion provided on a lower shell of said cartridge body; and
   at least one convex portion provided on an upper shell of said cartridge body,
   wherein a respective one of said at least one convex portion is inserted into a respective one of said at least one concave portion.

* * * * *